United States Patent
Cacabelos et al.

(10) Patent No.: US 9,639,995 B2
(45) Date of Patent: May 2, 2017

(54) METHODS AND SYSTEMS FOR GENERATING AND OUTPUTTING TEST DRIVE SCRIPTS FOR VEHICLES

(71) Applicant: Snap-on Incorporated, Kenosha, WI (US)

(72) Inventors: Kahlil H. Cacabelos, San Jose, CA (US); Roy S. Brozovich, Campbell, CA (US); Patrick S. Merg, Hollister, CA (US); Mark C. Theriot, McHenry, IL (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 14/631,689

(22) Filed: Feb. 25, 2015

(65) Prior Publication Data

US 2016/0247331 A1   Aug. 25, 2016

(51) Int. Cl.
*G06F 11/00* (2006.01)
*G07C 5/08* (2006.01)
*G06Q 10/00* (2012.01)

(52) U.S. Cl.
CPC .......... *G07C 5/0808* (2013.01); *G06Q 10/00* (2013.01); *G07C 5/085* (2013.01); *G07C 5/0825* (2013.01)

(58) Field of Classification Search
None
See application file for complete search history.

(56) References Cited

U.S. PATENT DOCUMENTS 4,984,168 A   1/1991   Neukrichner et al.
5,058,044 A   10/1991  Stewart et al.
(Continued)

FOREIGN PATENT DOCUMENTS

GB   2448972 A      11/2008
WO   02/17118 A2    2/2002
(Continued)

OTHER PUBLICATIONS

Snap-On Incorporated, Ask-aTech FAQ, downloaded from the world wide web at http://web.archive.org/web/20110920223204/http://www.askatech.com/AskATechLive/faq.aspx as archived on Sep. 20, 2011, 10 pages.
(Continued)

*Primary Examiner* — Truc M Do
*Assistant Examiner* — Jess Whittington
(74) *Attorney, Agent, or Firm* — McDonnell Boehnen Hulbert & Berghoff LLP

(57) ABSTRACT

Systems and methods pertaining to generating a test drive script (TDS) based on vehicle data values (VDV) from a vehicle and driving circumstance parameters (DCP) that correspond to use of the vehicle when the VDV are captured are described herein. The TDS can include a baseline path that includes the paths taken by the vehicle while the VDV are captured. The TDS can include an alternate path that includes paths that approximate one or more paths taken by the vehicle while the VDV are captured. The VDV can include, but are not limited to, DTC and PID values from the vehicle. The DCP can include, but are not limited to, traffic condition parameters, meteorological parameters, location parameters, and motion parameters. The TDS can include notifications to alert a user to a location where certain VDV were captured to assist the user in recreating a symptom in a vehicle.

23 Claims, 13 Drawing Sheets

(56) References Cited

U.S. PATENT DOCUMENTS

| | | | |
|---|---|---|---|
| 5,950,169 | A | 9/1999 | Borghesi et al. |
| 6,263,322 | B1 | 7/2001 | Kirkevold et al. |
| 6,308,120 | B1 | 10/2001 | Good |
| 6,311,162 | B1 | 10/2001 | Reichwein et al. |
| 6,370,454 | B1 | 4/2002 | Moore |
| 6,411,895 | B1 | 6/2002 | Lau et al. |
| 6,567,743 | B1 | 5/2003 | Mueller et al. |
| 6,609,050 | B2 | 8/2003 | Li |
| 6,701,248 | B2 | 3/2004 | Petzold et al. |
| 6,714,862 | B1 | 3/2004 | Lau et al. |
| 6,768,935 | B1 | 7/2004 | Morgan et al. |
| 6,845,307 | B2 | 1/2005 | Rother |
| 6,972,669 | B2 * | 12/2005 | Saito ............... B60G 17/0185 340/438 |
| 6,996,469 | B2 | 2/2006 | Lau et al. |
| 7,020,620 | B1 | 3/2006 | Bargnes et al. |
| 7,072,765 | B2 | 7/2006 | Schmidt et al. |
| 7,092,937 | B2 | 8/2006 | Morgan et al. |
| 7,127,455 | B2 | 10/2006 | Carson et al. |
| 7,171,372 | B2 | 1/2007 | Daniel et al. |
| 7,209,817 | B2 | 4/2007 | Abdel-Malek et al. |
| 7,362,239 | B2 | 4/2008 | Franczyk et al. |
| 7,373,225 | B1 | 5/2008 | Grier et al. |
| 7,373,226 | B1 | 5/2008 | Cancilla et al. |
| 7,392,122 | B2 * | 6/2008 | Pillar .................... A62C 27/00 701/22 |
| 7,444,216 | B2 | 10/2008 | Rogers et al. |
| 7,551,993 | B1 | 6/2009 | Cancilla et al. |
| 7,613,627 | B2 | 11/2009 | Doyle et al. |
| 7,881,838 | B2 | 2/2011 | Larschan et al. |
| 7,973,653 | B2 | 7/2011 | Adachi |
| 8,121,784 | B2 | 2/2012 | Templeton et al. |
| 8,620,573 | B2 | 12/2013 | Rychlak et al. |
| 9,092,914 | B2 * | 7/2015 | Muetzel ................ G07C 5/00 |
| 2002/0007237 | A1 | 1/2002 | Phung et al. |
| 2002/0007289 | A1 | 1/2002 | Malin et al. |
| 2002/0128874 | A1 | 9/2002 | McIntosh et al. |
| 2002/0138185 | A1 | 9/2002 | Trsar et al. |
| 2003/0004624 | A1 | 1/2003 | Wilson et al. |
| 2003/0130966 | A1 | 7/2003 | Thompson et al. |
| 2003/0195681 | A1 | 10/2003 | Rother |
| 2004/0085198 | A1 * | 5/2004 | Saito ............... B60G 17/0185 340/438 |
| 2004/0176885 | A1 | 9/2004 | Quinn |
| 2005/0085964 | A1 | 4/2005 | Knapp et al. |
| 2005/0154749 | A1 | 7/2005 | Snow et al. |
| 2005/0171661 | A1 | 8/2005 | Abdel-Malek et al. |
| 2005/0187834 | A1 | 8/2005 | Painter et al. |
| 2005/0251450 | A1 | 11/2005 | Koether et al. |
| 2005/0273218 | A1 | 12/2005 | Breed et al. |
| 2006/0095230 | A1 | 5/2006 | Grier et al. |
| 2006/0101074 | A1 | 5/2006 | Cancilla et al. |
| 2006/0106510 | A1 * | 5/2006 | Heffington .......... B60R 16/0231 701/29.6 |
| 2006/0106797 | A1 | 5/2006 | Srinivasa et al. |
| 2006/0142907 | A1 | 6/2006 | Cancilla et al. |
| 2007/0043487 | A1 | 2/2007 | Krzystofczyk et al. |
| 2007/0124040 | A1 | 5/2007 | Chen |
| 2007/0208467 | A1 | 9/2007 | Maguire et al. |
| 2008/0004764 | A1 * | 1/2008 | Chinnadurai ...... G05B 23/0235 701/31.4 |
| 2008/0051955 | A1 | 2/2008 | Ross et al. |
| 2008/0183351 | A1 | 7/2008 | Grier et al. |
| 2008/0195271 | A1 * | 8/2008 | Bertosa ............. G07C 5/0808 701/31.4 |
| 2009/0005974 | A1 | 1/2009 | Lenneman et al. |
| 2009/0055045 | A1 | 2/2009 | Biswas et al. |
| 2009/0062977 | A1 | 3/2009 | Brighenti |
| 2009/0295559 | A1 | 12/2009 | Howell et al. |
| 2009/0306884 | A1 | 12/2009 | Mueller |
| 2010/0023203 | A1 | 1/2010 | Shibi |
| 2010/0063668 | A1 | 3/2010 | Zhang et al. |
| 2010/0076644 | A1 | 3/2010 | Cahill et al. |
| 2010/0138242 | A1 | 6/2010 | Ferrick et al. |
| 2010/0152962 | A1 | 6/2010 | Bennett et al. |
| 2010/0254346 | A1 | 10/2010 | Jain et al. |
| 2011/0015822 | A1 | 1/2011 | Liebl et al. |
| 2011/0118905 | A1 | 5/2011 | Mylaraswamy et al. |
| 2011/0118934 | A1 | 5/2011 | Lowrey et al. |
| 2011/0172874 | A1 | 7/2011 | Patnaik et al. |
| 2011/0238258 | A1 | 9/2011 | Singh et al. |
| 2011/0248842 | A1 | 10/2011 | Yang et al. |
| 2012/0041637 | A1 | 2/2012 | Allemang |
| 2012/0245791 | A1 | 9/2012 | Yun et al. |
| 2012/0303205 | A1 | 11/2012 | Subramania et al. |
| 2013/0110344 | A1 | 5/2013 | Merg et al. |
| 2013/0138460 | A1 | 5/2013 | Schumann, Jr. et al. |
| 2013/0223329 | A1 | 8/2013 | Jain et al. |
| 2013/0304306 | A1 | 11/2013 | Selkirk et al. |
| 2013/0317694 | A1 * | 11/2013 | Merg ................... G07C 5/008 701/31.6 |
| 2013/0325541 | A1 | 12/2013 | Capriotti et al. |
| 2014/0032098 | A1 | 1/2014 | Anderson |
| 2014/0032422 | A1 | 1/2014 | Jones |
| 2014/0067243 | A1 | 3/2014 | Muehlmann et al. |
| 2014/0121888 | A1 | 5/2014 | Guo et al. |
| 2014/0207771 | A1 | 7/2014 | Merg |
| 2014/0279707 | A1 * | 9/2014 | Joshua ............... G06Q 30/0283 705/400 |
| 2014/0379205 | A1 * | 12/2014 | Muetzel ................. G07C 5/00 701/32.4 |
| 2015/0206360 | A1 * | 7/2015 | Schnurr ............ B60W 50/0097 701/29.1 |

FOREIGN PATENT DOCUMENTS

| | | |
|---|---|---|
| WO | 2004092918 A2 | 10/2004 |
| WO | 2013063232 A1 | 5/2013 |
| WO | 2014001799 A1 | 1/2014 |
| WO | 2014173592 A1 | 10/2014 |

OTHER PUBLICATIONS

Snap-On Incorporated, ShopKey Pro, Now even smarter, to your shop look even smarter, Apr. 13, 2012, 4 pages.

Ben-Bassat, Moshe, et al., "Workflow Management Combined with Diagnostic and Repair Expert System Tools for Maintenance Operations", Autotestcon '93, San Antonio, TX, Sep. 20-23, 1993, pp. 367-375.

Muller, Tobias Carsten; et al; A Heuristic Approach for Offboard-Diagnostics in Advanced Automotive Systems; Apr. 20, 2009; 9 pages; SAE World Congress 2009, Detroit, MI, USA; SAE Document No. 2009-01-1027.

Jain, Anil K.; Mao, Jianchang; Mohiuddin, K.M; Artificial Neural Networks: A Tutorial; Mar. 1996; 14 pages; IEEE.

Jain, A.K.; Murty, M.N.; Flynn, P.J.; Data Clustering: A Review; Sep. 1999; 60 pages; ACM Computing Surveys, vol. 31, No. 3.

Carlisle & Company, Inc.; Big data and the future of vehicle diagnostics; Dec. 2014, 9 pages.

Bosch Media Service; Automotive technology, downloaded from the world wide web at http://www.bosch-presse.de/presseforum/details.htm?txtID=6419&tk_id=108&locale=en, Sep. 10, 2013; 2 pages.

Genivi Alliance; Get your IVI products to market faster; downloaded from the world wide web at http://www.genivi.org/ on Jul. 30, 2014; 2 pages.

Racelogic Ltd; Performance Box, GPS Performance Meter; Dec. 7, 2010; 2 pages.

Racelogic Ltd; Performance Box Sport—User Guide, Oct. 17, 2012; 64 pages.

TRW Automotive; Body control systems Europe & emerging markets, Rain sensor; Sep. 26, 2002; 1 page.

Racelogic Ltd; Performance Box, Congratulations on purchasing a racelogic performance boxl; Apr. 25, 2012; 74 pages.

Racelogic Ltd; Video VBOX Waterproof; Apr. 2012, 6 pages.

Scantool.Net; Welcome to the OBD Programmer's Page, Nov. 1, 2004; 60 pages.

(56) References Cited

OTHER PUBLICATIONS

Analog Devices Inc., ±300% Yaw Rate Gyro with SPI Interface; ADIS16100; Feb. 10, 2006; 16 pages.
European Patent Office, Interational Searching Authority, Written Opinion of the International Searching Authority for International Application No. PCT/US2016/016432, 6 pages, mailing date May 18, 2016.
European Patent Office, Interational Searching Authority, International Search Report for International Application No. PCT/US2016/016432, 5 pages, mailing date May 18, 2016.

* cited by examiner

| Request | Destination | Source | Mode | PID |
|---|---|---|---|---|
| 1 | Engine ECU | DC 104 | 1 | 05 |
| 2 | Engine ECU | DC 104 | 1 | 0F |
| 3 | Engine ECU | DC 104 | 3 | N/A |
| 4 | Engine ECU | DC 104 | 1 | 05 |
| 5 | Engine ECU | DC 104 | 1 | 0F |
| 6 | Engine ECU | DC 104 | 3 | N/A |

1000 →

Arrows: 1002 (Source), 1004, 1006, 1008, 1010, 1012 (PID)

| Response | Destination | Source | Mode | Data-1 | Data-2 | Time |
|---|---|---|---|---|---|---|
| 1 | DC 104 | Engine ECU | 1 | PID 05 | 78° C | Time-1 |
| 2 | DC 104 | Engine ECU | 1 | PID 0F | 32° C | Time-2 |
| 3 | DC 104 | Engine ECU | 3 | Null | Null | Time-3 |
| 4 | DC 104 | Engine ECU | 1 | PID 05 | 0° C | Time-4 |
| 5 | DC 104 | Engine ECU | 1 | PID 0F | 32° C | Time-5 |
| 6 | DC 104 | Engine ECU | 3 | P0115 | P0116 | Time-6 |

1014 →

Arrows: 1016, 1018, 1020, 1022, 1024, 1026

FIG. 10

METHODS AND SYSTEMS FOR GENERATING AND OUTPUTTING TEST DRIVE SCRIPTS FOR VEHICLES

BACKGROUND

Unless otherwise indicated herein, the elements described in this section are not prior art to the claims and are not admitted to be prior art by inclusion in this section.

Most vehicles, such as an automobile or a heavy-duty truck, typically exhibit some type of malfunction during the life of the vehicle. In some cases, a vehicle malfunction is easily diagnosable and repairable. In other cases, a vehicle malfunction is not easily diagnosable and repairable. In any of these cases, but especially the latter cases, the vehicle owner may experience the vehicle malfunctioning while she drives the vehicle, but a technician that subsequently tries to diagnose and repair the malfunction may be unable to experience the vehicle malfunction while driving the vehicle.

Moreover, when the vehicle owner takes her vehicle to the technician for diagnosis and repair, the vehicle owner may be unable to recall some or all of the circumstances that occurred while the vehicle was malfunctioning. Both the relative difficulty in diagnosing and repairing the vehicle and the diagnosis and repair time may increase if the technician is unaware of those circumstances. It may be beneficial to provide the technician with a test drive script to guide the technician to drive the vehicle such that the vehicle is driven on roads where the owner's vehicle malfunctioned or a similar vehicle malfunctioned in a manner similar to the owner's vehicle so that the technician can experience the vehicle malfunction and confirm that a repair performed by the technician successfully fixed the vehicle.

OVERVIEW

Example embodiments pertaining to generating and using a test drive script (TDS) are described herein. In one respect, an example embodiment can take the form of a method comprising: (i) storing, by a computer-readable medium, a plurality of vehicle data values (VDV) pertaining to a first vehicle, (ii) storing, by the computer-readable medium, a plurality of driving circumstance parameters (DCP) corresponding to the VDV, (iii) generating, by a processor, a TDS based on a selection of at least one of the VDV and at least a portion of the DCP that correspond to the at least one of the VDV, (iv) storing, by the computer-readable medium, the TDS, and (v) outputting, by at least one of a user interface and a network interface, the stored TDS in response to a TDS request.

In another respect, an example embodiment can take the form of a system comprising: a processor, a network interface, a user interface, and a computer-readable medium storing a plurality of VDV pertaining to a first vehicle, a plurality of DCP corresponding to the VDV, and computer-readable program instructions, wherein the program instructions, when executed by the processor, cause a set of functions to be performed, the set of functions including: (i) generating a TDS based on a selection of at least one of the VDV and at least a portion of the DCP that correspond to the at least one of the VDV, (ii) storing the TDS within the computer-readable medium, and (iii) outputting, by at least one of the user interface and the network interface, the stored TDS in response to a TDS request.

In yet another respect, an example embodiment can take the form of a computer-readable medium storing program instructions, that when executed by a processor, cause a set of functions to be performed, the set of functions comprising: (i) storing, by the computer-readable medium, a plurality of VDV pertaining to a first vehicle, (ii) storing, by the computer-readable medium, a plurality of DCP corresponding to the VDV, (iii) generating, by a processor, a TDS based on a selection of at least one of the VDV and at least a portion of the DCP that correspond to the at least one of the VDV, (iv) storing, by the computer-readable medium, the TDS, and (v) outputting, by at least one of a user interface and a network interface, the stored TDS in response to a TDS request.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 10 shows VDV in accordance with the example embodiments described herein.

DETAILED DESCRIPTION

I. Introduction

Figure 1:
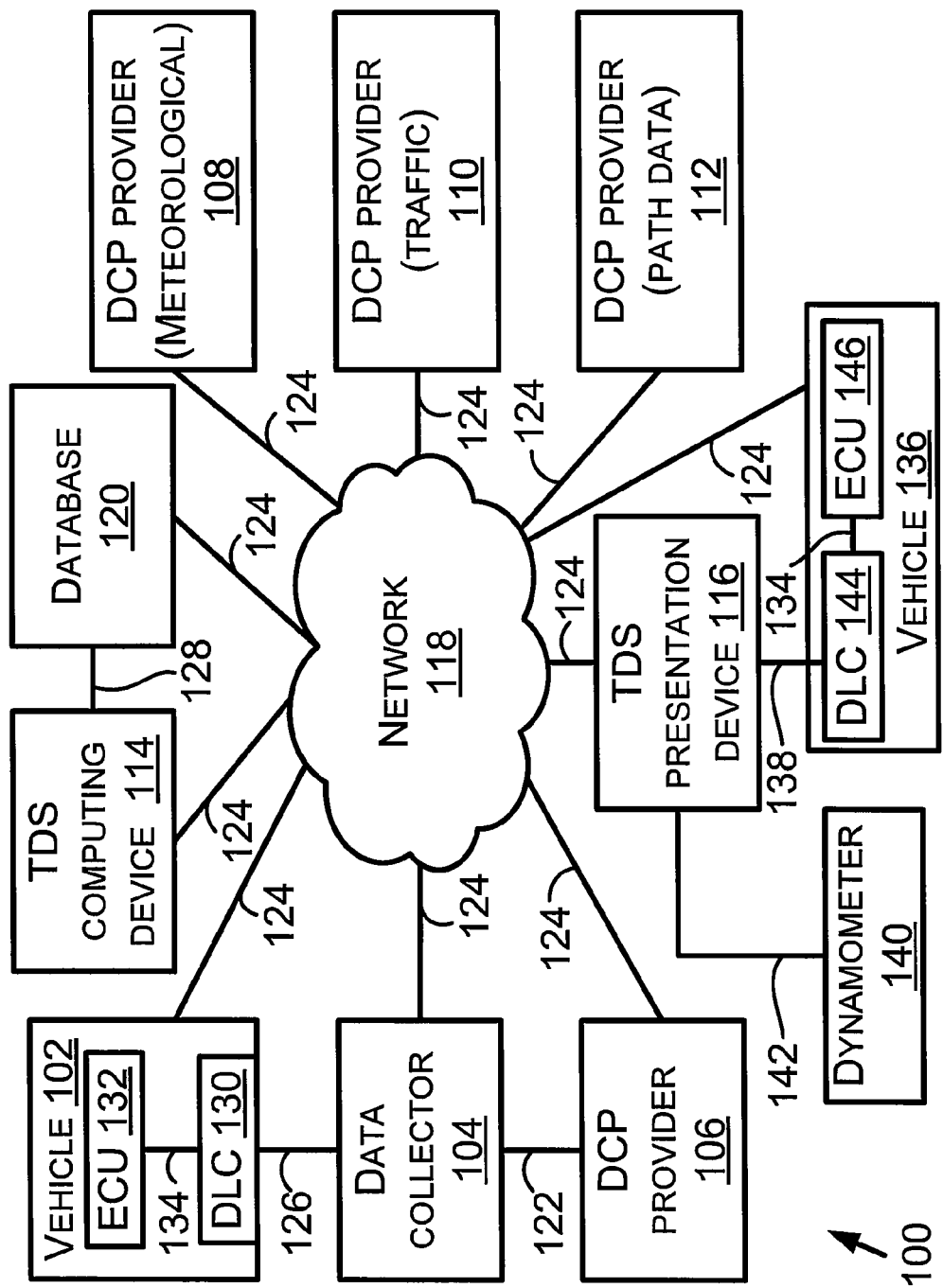
FIG. 1 is a block diagram of a system in accordance with the example embodiments described herein.

This description describes several example embodiments including, but not limited to, example embodiments pertaining to generating, storing, and outputting a test drive script. A TDS, such as a baseline TDS, can include instructions for following a baseline path upon which a vehicle traveled while generating VDV upon which the TDS is based. A TDS, such as an alternative TDS, can include instructions for following an alternative path that is different than the baseline path but has a number of path characteristics that match or substantially match path characteristics of a baseline path. An alternative TDS can include at least one of the vehicle data values, load instructions, control instructions, and time intervals for controlling operation of a vehicle in a manner similar to a manner in which a vehicle was driven when the VDV were captured by a data collector.

A TDS presentation device can output a TDS to guide a technician while performing a test drive of a vehicle (e.g., driving the vehicle in an attempt to recreate a service condition or vehicle malfunction or to confirm a repair to the vehicle successfully fixed the service condition or vehicle malfunction). A TDS presentation device can output a TDS to a vehicle for controlling operation of the vehicle or for outputting the TDS by an ECU or an output device within the vehicle. A TDS presentation device can output a TDS to a path or load simulator, such as a dynamometer, to provide a vehicle with operating conditions such that the vehicle produces VDV similar to the VDV in the TDS. Outputting a TDS can include outputting an entire TDS or a portion thereof.

Configuring a system with the ability to generate, store, or output a TDS, such as a baseline TDS or an alternative TDS overcomes an inability of current systems to generate, store, or output a TDS. Moreover, an alternative TDS can be output to guide a technician to drive a first vehicle in a first location (e.g., Columbus, Ohio) even though the baseline TDS is based on VDV or DCP pertaining to a second vehicle previously driven in a second location (e.g., San Jose, Calif.).

In this description, the articles "a", "an", or "the" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The block diagrams, flow charts, and other data shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions (CRPI) or by any combination of hardware, firmware, or software.

The description includes examples of data values within various messages or data storage devices. The example data values can include hexadecimal data values. The data values in this description contained within square brackets (i.e., [ ]) represent hexadecimal data values. The example data values can also include decimal data values. Any described data value not identified as a hexadecimal data value can be considered to be a decimal data value. The example embodiments are not limited to using decimal and hexadecimal data values.

Each element shown in FIG. 1, FIG. 2, FIG. 3, FIG. 4, FIG. 5, and FIG. 13, can be or include a separate article of manufacture or can be or include one or more articles of manufacture.

II. Example Systems

FIG. 1 is a block diagram of a system 100 in accordance with the example embodiments. The system 100 includes a vehicle 102, a vehicle 136, a data collector 104, DCP providers 106, 108, 110, and 112, a TDS computing device 114, a TDS presentation device 116, a network 118, a database 120, local communication links 122, 128, and 142, network communication links 124, vehicle interface links 126 and 138, and a dynamometer 140.

The local communication links 122, 128, and 142, the network communication links 124, and the vehicle interface links 126 and 138 can include a wired communication link, a wireless communication link, or a combination of a wired link and a wireless communication link, but are not so limited. Furthermore, the various links 122, 124, 126, 128, 138, and 142 can communicatively couple two or more elements together so as to allow at least one of the communicatively coupled elements to communicate with at least one of the other communicatively coupled elements using a circuit-switched technique, a packet-switched technique, or some other technique. The circuit-switched technique can include establishing a point-to-point connection between the two or more elements. The packet-switched technique can include transmitting blocks of data (e.g., packets), based on a destination address within the blocks of data, to at least one of the other communicatively coupled elements.

A vehicle, such as the vehicle 102 or 136, can include an automobile, a motorcycle, a light-duty truck, a medium-duty truck, a heavy-duty truck, a semi-tractor, a farm machine, or some other type of vehicle that can be driven or otherwise guided along a path (e.g., a paved road). A vehicle can include or use any appropriate voltage or current source, such as a battery, an alternator, a fuel cell, and the like, providing any appropriate current or voltage, such as about 12 volts, about 42 volts, and the like. A vehicle can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof.

The vehicle 102 can include one or more electronic control units (ECU) 132 to control aspects of operating the vehicle. For example, the vehicle 102 can include a powertrain system ECU, an engine system ECU, a supplemental inflatable restraint system (i.e., an airbag system) ECU, an entertainment system ECU, or some other ECU. One or more of the ECU can receive inputs (e.g., a sensor input), control output devices (e.g., a solenoid), generate VDV (such as a VDV based on a received input or a controlled output), and generate a diagnostic trouble code (DTC). As another example, the vehicle 102 can include one or more ECU of an infotainment system, such as, but not limited to, a vehicle navigation ECU or a radio sound system (e.g., an AM/FM/XM® band sound system) ECU. As yet another example, the vehicle 102 can include one or more ECU of an autonomous driving system for operating the vehicle 102 as a driverless vehicle. The vehicle 136 can include one or more ECU 146 to control aspects of operating the vehicle 136 in a manner similar to or different than an ECU 132 of the vehicle 102.

One or more ECU within a vehicle can connect to a vehicle communication link 134. Vehicle communication link 134 can include a data link connector (DLC) 130, such as a Society of Automotive Engineers (SAE) J1962 connector or some other connector, for connection to the data collector 104 by a vehicle interface link 126. The vehicle communication links 134 and vehicle interface links 126 and 138 can include one or more distinct vehicle communication links that carry communications according to a common or different vehicle communication protocol. The vehicle interface link 138 can include the DLC 144.

The data collector 104 can include a device or system that receives (e.g., collects) VDV from a vehicle, such as the vehicle 102, stores the VDV in a computer-readable medium, and provides the VDV to the TDS computing device 114 or some other element within the system 100. The data collector 104 can communicatively couple to the vehicle 102 by the vehicle interface link 126. The data collector 104 can communicatively couple to the vehicle 136 by the vehicle interface link 138 or to other vehicles (not shown). The data collector 104 can be configured to communicatively couple with one vehicle at a time or more than one vehicle at a time.

The DCP provider 106 is configured as a local DCP provider with respect to the data collector 104 because the DCP provider 106 is communicatively coupled directly to the data collector 104 by the local communication link 122. In a first respect, the local communication link 122 can include a wired communication link that communicatively couples the data collector 104 and the DCP provider 106. In a second respect, the local communication link 122 can operate using a short-range wireless communication protocol such as, but not limited to, an Institute of Electrical and Electronics Engineers (IEEE) 802.15.1 standard for wireless personal area networks (PANs), a Bluetooth version 4.1 standard developed by the Bluetooth Special Interest Group (SIG) of Kirkland, Wash., or an IEEE 802.11 standard for wireless LANs, which is sometimes referred to as a Wi-Fi standard. The DCP provider 106 can be configured like or include aspects of the DCP provider 500 shown in FIG. 5.

THE DCP providers 108, 110, and 112 are configured as remote DCP providers to the data collector 104 as the remote DCP providers are communicatively coupled to the data collector 104 by the network 118 and the network communication links 124. As shown in FIG. 1, the data collector 104 and the DCP provider 106 are connected to the network 118 by the network communication links 124 such that the DCP provider 106 could, but is not required to, function as a remote DCP provider to the data collector 104 or to a different data collector (not shown). Two or more of the DCP providers described herein, such as the DCP providers 110 and 112, can be arranged as a single DCP provider. The DCP providers 108, 110, or 112 can be configured like or include aspects of the DCP provider 500.

The DCP provider 108 can provide DCP including meteorological parameters (i.e., data) to devices within the system 100. The meteorological data can include, but is not limited to, temperature data (e.g., one or more temperature values), barometric data (e.g., one or more barometric values), humidity data (e.g., one or more humidity values), and rainfall data (e.g., one or more rainfall per time values). The meteorological data can include corresponding time data so that the meteorological data can be associated with (i.e., correspond to) VDV and other DCP that correspond to (i.e., are associated with) similar time data. Some or all of the meteorological data provided by the DCP provider 108 can be provided by or based on data provided by the National Oceanic and Atmospheric Administration of the United States Department of Commerce or by some other source of meteorological data.

The DCP provider 110 can provide DCP including traffic data to devices within the system 100. The traffic data can include, but is not limited to, velocity data (e.g., a velocity or speed value corresponding to a particular path and time). The traffic data can include corresponding time data so that the traffic data can be associated with VDV and other DCP that correspond to similar time data. Some or all of the traffic data provided by the DCP provider 110 can be provided by or based on data provided by a state highway traffic authority, such as the Illinois State Toll Highway Authority or by some other source of traffic data.

The DCP provider 112 can provide DCP including path data to devices within the system 100. The path data can include, but is not limited to, elevation data (e.g., elevations values corresponding to particular portions of a path), path name data (e.g., data indicating names of particular paths), speed limit data (e.g., speed limits corresponding to particular portions of a path), direction data (e.g., data identifying traffic directions for paths configured for reversible traffic flow), path inclination data (e.g., data that indicates a grade or slope of the path), path curvature data that indicates a degree in which the path curves, and path pavement data (e.g., data that indicates the type of pavement (e.g., bricks, cement, or asphalt) if the path is paved. The path data can include corresponding time data so that the path data can be associated with VDV and other DCP that correspond to similar time data. Some or all of the path data provided by the DCP provider 112 can be provided by NAVTEQ NAVSTREETS™ or by some other source of path data.

Figure 2:
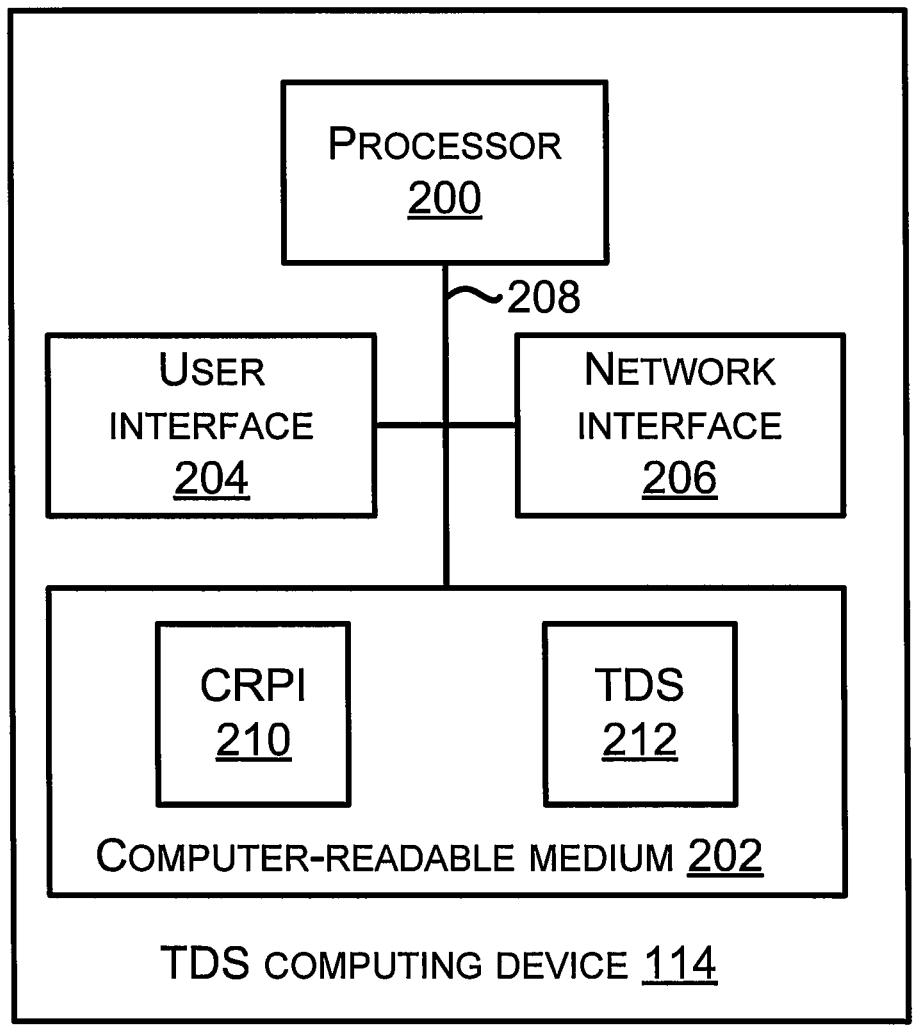
FIG. 2 is a block diagram showing details of a TDS computing device.

The TDS computing device 114 can include one or more elements that work separately or in combination to carry out functions pertaining to a TDS. Details regarding at least some of those elements are shown in FIG. 2. The functions pertaining to a TDS can include, but are not limited to, requesting, receiving, or storing data for generating a TDS, generating a TDS, storing a TDS in the database 120, searching for a TDS stored in the database 120, and outputting a TDS by the user interface 204 or the network interface 206. The TDS computing device 114 can communicatively couple to the network 118, the database 120, or one or more devices within the network 118. The TDS computing device 114 can communicatively couple to the database 120 directly by the local communication link 128.

Figure 4:
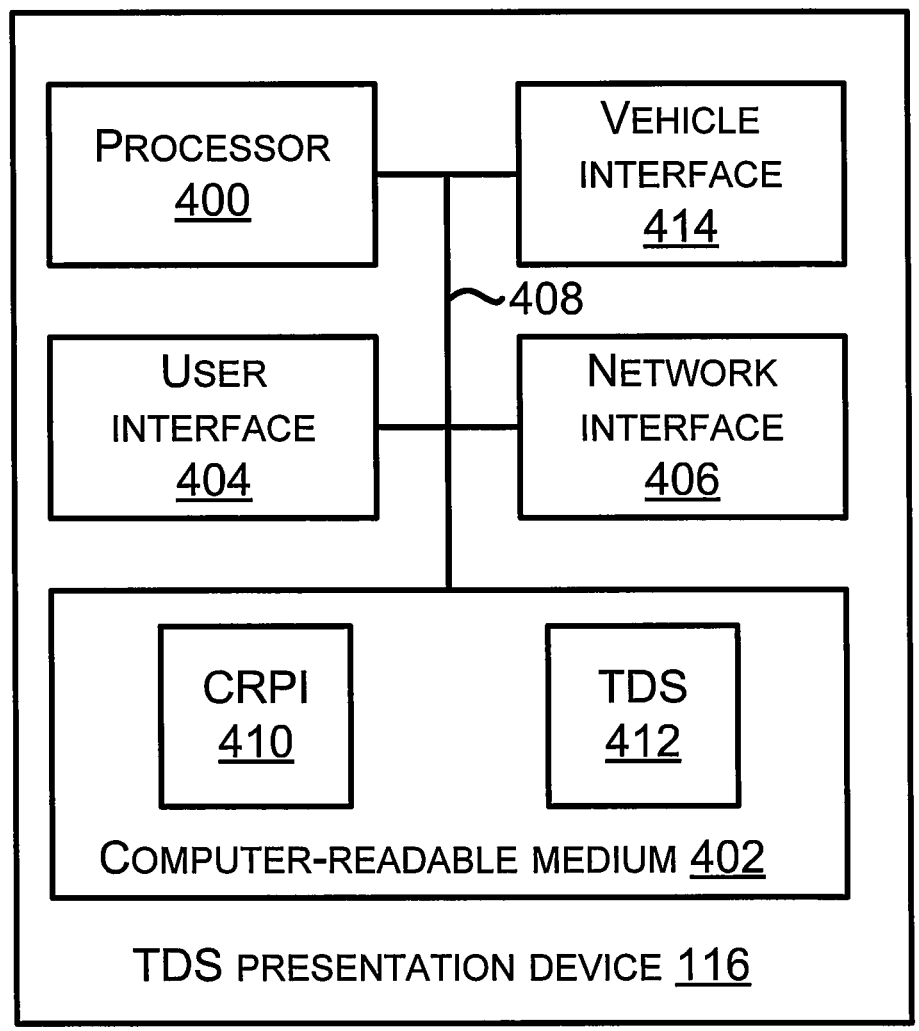
FIG. 4 is a block diagram showing details of a TDS presentation device.

The TDS presentation device 116 includes a device for generating and transmitting a TDS request, receiving a TDS in response to the TDS request, and presenting a TDS. The TDS presentation device 116 can communicatively couple to the network 118 or one or more devices within the network 118. Additional details regarding the TDS presentation device 116 are shown in FIG. 4. The TDS presentation device 116 can communicatively couple to the dynamometer 140 by the local communication link 142. The TDS presentation device 116 can operate as a data collector and can include the components of the data collector 104 or perform any of the functions described herein as being performed by the data collector 104.

The database 120 includes a computer-readable medium for storing a variety of computer-readable data. That computer-readable data can include, but is not limited to, VDV, DCP, and TDS. The database 120 can receive the variety of data from the data collector 104, the TDS computing device 114, a DCP provider, or some other element of the system 100.

The database 120 can store data for generating a TDS. As an example, the database 120 can include VDV and TDS instructions associated with a vehicle identifier, such as a year, make, and model of a vehicle. Table 1 shows vehicle identifiers for two different vehicles (i.e., Y/M/M-1 (e.g., a 1998 Chevrolet Corvette) and Y/M/M-2 (e.g., a 2013 Ford Escape)) and a complaint, cause, and correction (C/C/C)

associated with VDV captured in an instance of the identified vehicle experiencing the C/C/C. The VDV in Table 1 include VDV that indicate an engine RPM value and an intake MAP value captured for an instance of the vehicle identified by the vehicle identifier. The database 120 can include load instruction data (e.g., a throttle position sensor value), and a control instruction (e.g., an air conditioning system state or a transmission gear position (e.g., drive or neutral)) for including in a TDS for another instance of the identified vehicle. Other examples of the vehicle identifiers, C/C/C, VDV, load instruction data, and the control instructions are also possible. A time or location identifier may be associated with each instance of data shown in Table 1.

TABLE 1

| Vehicle Identifier | C/C/C | VDV (Engine RPM) | VDV (Intake MAP) | TPS Percent (Mode [01], PID [11]) VDV | Control Instruction |
|---|---|---|---|---|---|
| Y/M/M-1 | DTC P0301 | 750 | 45 kPA | 42% | A/C on, Drive |
| Y/M/M-1 | DTC P0301 | 775 | 47.5 kPA | 48% | A/C on, Drive |
| Y/M/M-1 | DTC P0301 | 1,000 | 45 kPA | 51% | A/C on, Drive |
| Y/M/M-2 | DTC P0102 | 1,500 | 50 kPA | 62% | A/C off, Neutral |

The network 118 (i.e., one or more networks) can include any of a variety of communication networks. Each communication network of the network 118 can include, but is not limited to, a wired communication network, a wireless communication network, or a combination of a wired and a wireless communication network. The network 118 can include the communication links 122 and 124, various switches (not shown), various gateways (not shown) and other network components. The network 118 can include the elements communicatively coupled to the communication links 124. A portion of the network 118 can include a local area network (LAN) such as a LAN within a repair shop. A portion of the network 118 can include the Internet. A portion of the network 118 can include a cellular telephone network.

Two or more of the elements shown in FIG. 1, as well as other elements described herein, can communicatively couple to each other. Two or more elements communicatively coupled to each other can transmit communications to each other and can receive communications transmitted by the other elements. A communicative coupling between two or more elements can occur by any of the communication links described herein, but is not so limited.

An example use of the components of the system 100 include a vehicle owner driving the vehicle 102 with the data collector 104 communicatively coupled to the vehicle 102, and the data collector 104 capturing VDV while the owner is driving the vehicle 102. A location DCP provider 106 may be communicatively coupled to the data collector 104 or the vehicle 102 while the vehicle owner is driving the vehicle. The vehicle owner then takes the vehicle 102 and the data collector 104 to a technician at a vehicle repair shop. The technician can request a TDS using TDS presentation device 116. The TDS computing device 114 can generate a TDS based on VDV captured by the data collector 104, DCP provided by the DCP provider 106, and requested from the DCP providers 108, 110, or 112 based on, at least in part, the VDV and DCP captured while the vehicle owner was driving the vehicle 102. The TDS presentation device 116 can receive the TDS and present the TDS to guide the technician while driving the vehicle 102 in an attempt to recreate a vehicle symptom exhibited by the vehicle 102 while driven by the vehicle owner or to confirm a repair to the vehicle 102 was successful.

Another example use of the components of the system 100 include the TDS presentation device 116 receiving a TDS and providing control commands to the dynamometer 140 while the vehicle 136 is positioned on the dynamometer 140. The control commands can be based on data values that the TDS presentation device 116 receives from the vehicle 136. The dynamometer 140 can be controlled using the control commands so as to generate conditions that cause the vehicle 136 to exhibit load conditions indicated by the TDS. The load conditions indicated by the TDS can include conditions of a vehicle being driven in a single direction without any turns. This example use can benefit technicians that desire to simulate conditions on a road on which a vehicle was driven to generate the TDS without having to actually drive the vehicle on a road. For instance, the TDS can be based on a vehicle being driven on a road with steep inclines, but the technician and the vehicle 136 are located in an area that does not have roads with similar steep inclines.

Another example use of the components of the system 100 include the vehicle 102 transmitting VDV to the TDS computing device 114 over the network communication link 124. The TDS computing device 114 can provide the VDV received from the vehicle 102 to the database 120. The components used to perform these aspects of communicating the VDV can be referred to as the telematics components. The data collector 104 can request and receive the VDV that the vehicle 102 provides to the TDS computing device 114. Other examples of using one or more of the components of the system 100 are also possible.

Next, FIG. 2 is a block diagram of the TDS computing device 114. The TDS computing device 114 includes a processor 200, a computer-readable medium 202, a user interface 204, and a network interface 206, two or more of which can be communicatively coupled or linked together via a system bus, network, or other connection mechanism 208. The TDS computing device 114 can include or be configured as a desktop or laptop computing device or a server workstation that includes the elements of the TDS computing device 114 shown in FIG. 2. The computer-readable medium 202 can store CRPI 210, TDS 212, and other data, but is not so limited. The local communication link 128 can communicatively couple the network interface 206 and the database 120.

A processor, such as the processor 200 or any other processor disclosed herein, can include one or more general purpose processors (e.g., INTEL® single core microprocessors or INTEL® multicore microprocessors) or one or more special purpose processors (e.g., digital signal processors). Additionally or alternatively, a processor can include an application specific integrated circuit (ASIC). The processor 200 can be configured to execute CRPI, such as the CRPI 210.

A computer-readable medium, such as computer-readable medium 202 or any other computer-readable medium disclosed herein, can include a non-transitory computer-readable medium readable by a processor. A computer-readable medium can include volatile or non-volatile storage components, such as optical, magnetic, organic or other memory or disc storage, which can be integrated in whole or in part with a processor, or which can be separate from a processor. A computer readable medium can include, but is not limited to, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or any other device that is capable of providing data or executable instructions that may be accessed by a processor, such as the processor 200. A computer-readable medium can be referred to by other terms such as, but not limited to, a "computer-readable storage medium," a "data storage device," a "memory device," or a "memory."

Additionally or alternatively, a computer-readable medium, such as the computer-readable medium 202 or any other computer-readable medium disclosed herein, can include a transitory computer-readable medium. The transitory computer-readable medium can include, but is not limited to, a communications medium such as a digital or analog communications medium (e.g., a fiber optic cable, a waveguide, a wired communication link, or a wireless communication link).

A user interface (UI), such as the user interface 204 or any other user interface disclosed herein, can include input UI elements and output UI elements. The input UI elements can include devices that allow a user to input data. As an example, the input UI elements can include, but are not limited to, a keyboard, a pointing device (e.g., a mouse), and a microphone and corresponding electronic circuitry. The output UI elements can include devices for presenting data to a user. As an example, the output UI elements can include, but are not limited to, a display unit (or more simply, a display) for presenting the data visually, and a loud speaker for presenting the data audibly. The display can include, but is not limited to, a liquid crystal display (LCD), a light emitting diode (LED) display, a plasma display, or a cathode ray tube (CRT) display. Some elements of a UI, such as a touch screen display can function as both an input UI element and an output UI element.

A network interface, such as the network interface 206 or any other network interface disclosed herein, can include an interface to the network 118 or to some other network or communication link. The interface to network 118 can include a transceiver having one or more transmitters configured for transmitting data over the network 118 to another device within the network 118 and one or more receivers configured to receive data transmitted over the network 118 from another device within the network 118. Any of the network interfaces disclosed herein can include circuitry, for example electronic circuitry, for converting data received from the network 118 to data that can be provided to a processor for processing the received data. The circuitry of the network interfaces can include a modulator demodulator (modem). Any of the network interfaces disclosed herein can include circuitry, for example electronic circuitry, for converting data received from another device, such as a processor or a computer-readable medium, to data in a form that can be transmitted over the network 118.

A network interface that provides for communicatively coupling to a wireless communication network can include one or more antennas for transmitting or receiving wireless communications. A network interface can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. The transmitter or transceiver can provide data or information to a communication port for transmission as network communications over the connected network. The receiver or transceiver can receive data or information received at a communication port from the connected network.

In general, CRPI, such as the CRPI 210 or any other CRPI disclosed herein, can include data structures, objects, programs, routines, or other program modules that may be accessed by a processor, such as the processor 202 or any other processor disclosed herein. For brevity purposes, those aspects are referred to herein simply as "program instructions." Execution of the CRPI can cause the processor or an element communicatively coupled to the processor to perform a particular function or set of functions.

In particular, the CRPI 210 can include program instructions to generate a TDS. Examples of generating a TDS are described with respect to FIG. 7 and FIG. 8. The CRPI 210 can include CRPI to carry out one or more of the functions shown in FIG. 7 or FIG. 8. The CRPI 210 can include program instruction to cause computer-readable medium to store a TDS within the TDS 212. The CRPI 210 can include program instructions to receive a TDS request, search the TDS 212 or the database 120 for a TDS based on the TDS request, and cause the network interface 206 to transmit a TDS discovered or retrieved from the TDS 212 or the database 120 in response to the TDS request. The TDS 212 can include the database 120, at least one TDS stored within the database 120, or one or more TDS not stored within the database 120.

Figure 3:
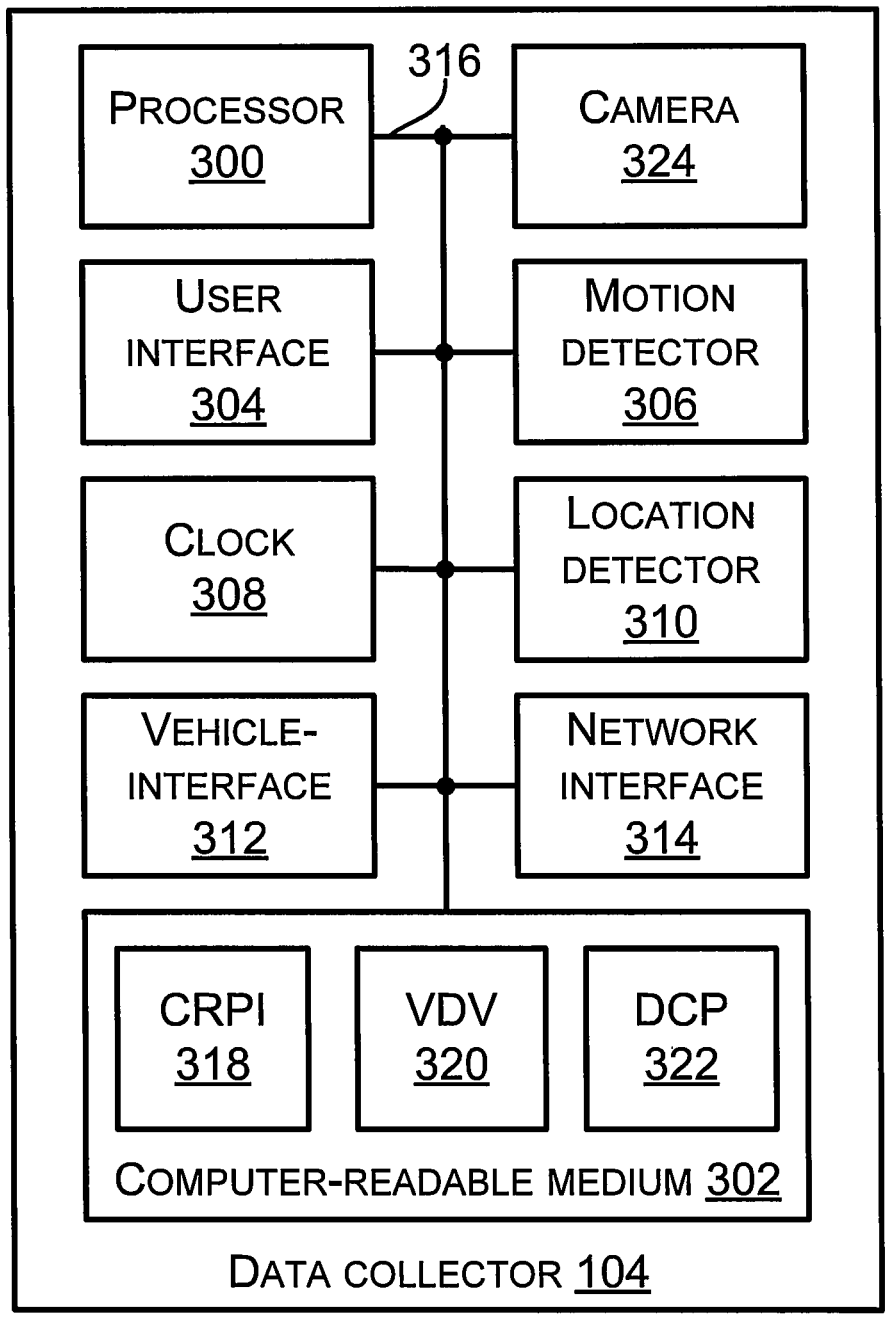
FIG. 3 is a block diagram showing details of a data collector.

Next, FIG. 3 is a block diagram of the data collector 104. The data collector 104 includes a processor 300, a computer-readable medium 302, a user interface 304, a motion detector 306, a clock 308, a location detector 310, a vehicle interface 312, a network interface 314, and a camera 324, two or more of which can be communicatively coupled or linked together via a system bus, network, or other connection mechanism 316. The data collectors of the example embodiments can include one or more of the components of the data collector 104. The computer-readable medium 302 can store CRPI 318, VDV 320, DCP 322, and other data, but is not so limited. The processor 300 can execute the CRPI 318. Any or all of the remarks above regarding, in general, a processor, a computer-readable medium, a user interface, and a network interface, are applicable to the processor 300, the computer-readable medium 302, the user interface 304, and the network interface 314 respectively.

The motion detector 306 includes one or more devices for determining motion data (e.g., an acceleration value, a velocity value, a speed value, or a heading value). One or more of the motion values can include an angular motion value, such as an angular acceleration value or an angular velocity value. As an example, the one or more devices can include an accelerometer or a yaw rate sensor. The motion detector 306 can provide the motion data to any other component of the data collector 104 by the connection mechanism 316. The motion data can be stored as DCP within the DCP 322.

A clock, such as the clock 308 or any other clock disclosed herein, can include a clock configured to provide time data for associating with a parameter, such as a VDV or a DCP, or a request, such as a TDS request, a VDV request or a DCP request. A clock can be integrated within a processor. Additionally or alternatively, the time data that the data collector 104 associates with a parameter can be provided by another component of the data collector 104, such as the location detector 310 or the network interface 314.

The location detector 310 includes one or more devices configured to determine a location to associate with other data, such as a VDV or a DCP. The determined location can be represented by a location identifier. A location or location identifier associated with a VDV or a DCP can be referred to as a location or location identifier corresponding to (or associated with) the VDV or a DCP respectively. As an example, a location identifier can include a latitude value and a longitude value, but is not so limited. As another example, a location identifier can include a Universal Transverse Mercator (UTM) zone number and an easting and northing coordinate pair within that UTM zone or some other data representing a location. As another example, a location identifier can include a path name and path location (e.g., United States Highway 1, mile marker 1).

The location detector 310 can include a Global Position System (GPS) receiver configured to receive GPS messages broadcast by a GPS satellite. The location detector 310 can use GPS messages from four separate GPS satellites to determine an accurate location of the location detector 310. The location detector 310 can determine a location from a message received by the network interface 314 from a device in the network 118 (e.g., a base station of a cellular telephone network) or from a message provided by a local DCP provider, such as the DCP provider 106.

The vehicle interface 312 includes one or more devices for communicatively coupling the data collector 104 to a vehicle, such as the vehicle 102. A device of a vehicle interface can include, but is not limited to, (i) a vehicle interface connector connectable to the DLC 130, (ii) a vehicle data bus interface including a transceiver, (iii) a harness that connects the vehicle interface connector to the DLC 130, or (iv) a wireless communication transceiver such as a Bluetooth® protocol transceiver. The transmitter of the transceiver can transmit VDV requests to the vehicle 102 and a receiver of the transmitter can receive the VDV from the vehicle 102. A vehicle interface can be configured to communicate with the vehicle 102 using any of a variety of vehicle communication protocols such as, but not limited to, the SAE J1850 protocol, the SAE J1939 protocol, the controller area network (CAN) protocol, the media oriented systems transport (MOST) protocol, a Diagnostic over Internet Protocol (DoIP) that meets an International Organization for Standardization (ISO) 13400 standard, or another vehicle communication protocol discussed herein.

The camera 324 can be configured to capture one or more images for storing within the computer-readable medium 302. One or more of the captured images can be stored within the DCP 322. Multiple captured images can be stored as a video within the DCP 322. As an example, an image captured by the camera 324 can show an external environment to a vehicle being driven. The external environment can be a traffic pattern, a path the vehicle is being driven on, or some other aspect in an environment external to the vehicle. As another example, an image captured by the camera 324 can show a component of a vehicle being driven. For instance, the component in the captured image can include an instrument panel that is displaying a malfunction indicator lamp or a driver warning message. As yet another example, an image captured by the camera 324 can include a screen capture of an image displayed by the user interface 304. For instance, the image displayed by the user interface can show a representation, numerical, graphical, or otherwise, of a VDV received from a vehicle. Other examples of captured images stored as part of the DCP 322 are also possible.

The CRPI 318 can include program instructions to generate or transmit a VDV request. Generating the VDV request can include the processor 300 determining which vehicle parameter identifier (PID) to include within the VDV request. In one respect, the processor 300 can determine which VDV to request based on, at least in part, a vehicle PID selected by the user interface 304. In another respect, the processor 300, while executing those program instructions, can refer to VDV request rules stored within the computer-readable medium 302 (as part of CRPI 318 or otherwise) to determine what VDV request should be sent to the vehicle 102. The VDV request rules can be conditioned on, at least in part, the year, make, and model of a vehicle. The VDV request rules can be based on, at least in part, one of a complaint, cause, and correction listed on a repair order, such as the complaint: check engine light on, the cause: DTC P0115 set, or the correction: replaced engine coolant temperature sensor. Examples of a VDV request are shown within VDV requests 1000 shown in FIG. 10.

As another example, the VDV request can include multiple VDV requests to request vehicle data values that indicate engine revolutions per minute (RPM) and intake manifold absolute pressure (intake MAP) from the vehicle 102. In accordance with the SAE J1979 standard, each VDV request for the engine RPM can include the data identifiers [01 0C], where [01] represents an OBD II Mode [01] and [0C] represents a vehicle PID [0C] (e.g., engine RPM), and each VDV request for intake MAP can include the data identifiers [01 0B], where [01] represents an OBD II Mode [01] and [0B] represents a vehicle PID [0B] (e.g., intake MAP). A TDS can include the responses to the multiple VDV requests.

Each response to the VDV request for engine RPM can include four data bytes, such as the data bytes [41 0C 0B B8], where [41] indicates a response message (e.g., the OBD II Mode [01] plus [40]), [0C] indicates the vehicle PID [0C], and [0B B8] are vehicle data values representing an engine RPM data value (¼ RPM per bit). The engine RPM for that example VDV request response is as follows: [0B B8]=3,000, and the engine RPM equals 3,000/4=750 RPM.

Each response to the VDV request for intake MAP can include three data bytes, such as the data bytes [41 0B 23], where [41] indicates a response message (e.g., OBD II Mode [01] plus [40]), [0B] indicates the vehicle PID [0B], and [23] is a data value representing the intake MAP data value. The intake MAP for that example VDV response is as follows: [23]=35 kPA.

The CRPI 318 can include program instruction to generate or transmit a DCP request. Generating the DCP request can include the processor 300 determining which DCP to include within the DCP request. In one respect, the processor 300 can determine which DCP to request based on, at least in part, a data collector configuration input (DCCI) entered or received by the user interface 304. In another respect, the processor 300, while executing those program instructions, can refer to DCP request rules stored within the computer-readable medium 302 (as part of the CRPI 318 or otherwise) to determine what DCP request should be sent to the vehicle 102. The DCP request rules can be conditioned on, at least in part, the year, make, and model of a vehicle. The DCP request rules can be based on, at least in part, one of a C/C/C listed on a repair order, such as the complaint: check engine light on, the cause: DTC P0115 set, or the correction: replaced engine coolant temperature sensor. Examples of a DCP request are shown within DCP requests 1100 shown in FIG. 11.

In accordance with the example embodiments, the data collector 104 can include or be configured as a desktop or laptop computing device that includes one or more of the components of the data collector 104 shown in FIG. 3. In accordance with the example embodiments, the data collector 104 can include or be configured as a diagnostic device or system, such as a MODIS™ ultra integrated diagnostic system provided by Snap-on Incorporated in Kenosha, Wis. or with components thereof. Moreover, the output UI elements of the user interface 304 can be configured like a ten inch high-resolution (e.g., 1024×600 resolution) touch screen display that is part of the Versus® Pro Diagnostic Information System provided by Snap-on Incorporated, but are not so limited.

The data collector 104 can include or be configured as a smartphone (such as an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), or a tablet device (such as an IPAD® tablet device from Apple Inc., or a SAMSUNG GALAXY TAB tablet device from Samsung Electronics Co., Ltd.). The CRPI 318 of a data collector including or configured as a smartphone or a tablet device can include an application downloaded to the data collector 104 from the APP STORE® online retail store or from the GOOGLE PLAY® online retail store.

Next, FIG. 4 is a block diagram of the TDS presentation device 116. A data collector, such as the data collector 104 or another device operational as a data collector, can include the elements or perform the functions of the TDS presentation device 116, as described herein.

The TDS presentation device 116 includes a processor 400, a computer-readable medium 402, a user interface 404, a network interface 406, and a vehicle interface 414, two or more of which can be communicatively coupled or linked together via a system bus, network, or other connection mechanism 408. The computer-readable medium 402 can store CRPI 410, TDS 412, and other data, but is not so limited. The processor 400 can execute the CRPI 410. Any or all of the remarks above regarding, in general, a processor, a computer-readable medium, a user interface, a network interface, and a vehicle interface, are applicable to the processor 400, the computer-readable medium 402, the user interface 404, the network interface 406, and the vehicle interface 414, respectively.

The CRPI 410 can include program instructions to generate a TDS request. Those program instructions can cause the output UI elements of the user interface 404 to display fields, pull-down menus, or the like, by which a user can enter data (such as vehicle identification information, location information, or vehicle symptom information) for including with the TDS request. The input UI elements of the user interface 404 can be used to enter the data. The vehicle identification information can include data that identifies at least a vehicle type (e.g., the year, make, and model of the vehicle 102) or data (e.g., vehicle identification number) that identifies a particular instance of the vehicle type. The vehicle symptom information can include one or more of a C/C/C listed on a repair order regarding the vehicle 102 when the vehicle 102 is a vehicle-under-service.

The CRPI 410 can cause the computer-readable medium 402 to store at least a portion of the vehicle symptom information.

The CRPI 410 can include program instructions to cause the network interface 406 to transmit the TDS request over the network 118 to the TDS computing device 114 or another device. The network interface 406 can transmit the TDS request and receive a TDS in response to the TDS request. The CRPI 410 can include program instructions to cause the network interface 410 to provide a received TDS to the processor 400, the computer-readable medium 402, the user interface 404, or the connection mechanism 408. Providing a TDS to the computer-readable medium 402 can include storing the TDS within TDS 412.

CRPI 410 can include program instructions to cause the output UI elements of the user interface 404 to output a TDS stored within the computer-readable medium 402. Outputting the TDS by the user interface 404 can include presenting at least a portion of the TDS, such as turn-by-turn navigation instructions, visually or audibly. The turn-by-turn instructions can include vehicle operation instructions such as accelerate quickly, accelerate slowly, brake quickly, or brake slowly, as well as instructions such as turn left, turn right, etc. Outputting a TDS can include displaying a map with highlighted paths to be followed. Outputting a TDS can include outputting any aspects of TDS 1200 (shown in FIG. 12). Outputting a TDS can include displaying an image or video captured by a camera, such as the camera 324.

The CRPI 410 can include program instructions to cause the vehicle interface 414 to output a TDS stored within the TDS 412. Outputting the TDS using the vehicle interface 414 can include the vehicle interface 414 transmitting the TDS over the vehicle interface link 138 to the DLC 144 of the vehicle 136. The TDS can be carried to one or more ECU 146 within the vehicle 136 over the vehicle communication link 134. As an example, an infotainment system ECU within the vehicle 136 can receive the TDS and output the TDS within the vehicle 136 (e.g., displaying TDS instructions, VDV or DCP on a visual display within the vehicle 136 or playing audible TDS instructions, VDV or DCP using one or more audio speakers within the vehicle 136). As another example, an autonomous vehicle ECU within the vehicle 136 can receive the TDS and control aspects of driving the vehicle (e.g., following a particular path, operating an engine with a particular load, or placing vehicle accessories in defined states (e.g., on or off)) based on the TDS.

To avoid providing too much information of a TDS using an infotainment system, the CRPI 410 can include a program instructions to reduce the amount of TDS information to be presented by a vehicle display. Those program instructions can include or operate in a manner similar to the mySPIN application provided by Bosch SoftTec GmbH that reduces the information from a smartphone application to be presented by a display within a vehicle. Additionally or alternatively, those program instructions may be compatible with the In-Vehicle Infotainment (IVI) open-source development platform developed by GENIVI®.

The TDS presentation device 116 can include or be configured as a desktop or laptop computing device that includes one or more of the components of the TDS presentation device 116 shown in FIG. 4. The TDS presentation device 116 can include or be configured as a diagnostic device or system, such as a MODIS™ ultra integrated diagnostic system or with components thereof. Moreover, the output UI elements of the user interface 404 can be configured like a ten inch high-resolution touch screen display that is part of the Versus® Pro Diagnostic Information System, but are not so limited. The TDS presentation device 116 can include or be configured as a smartphone or a tablet device. The CRPI 410 of the TDS presentation device 116 including or configured as a smartphone or a tablet device can include an application downloaded to the TDS presentation device from the APP STORE® online retail store or from the GOOGLE PLAY® online retail store.

Figure 5:
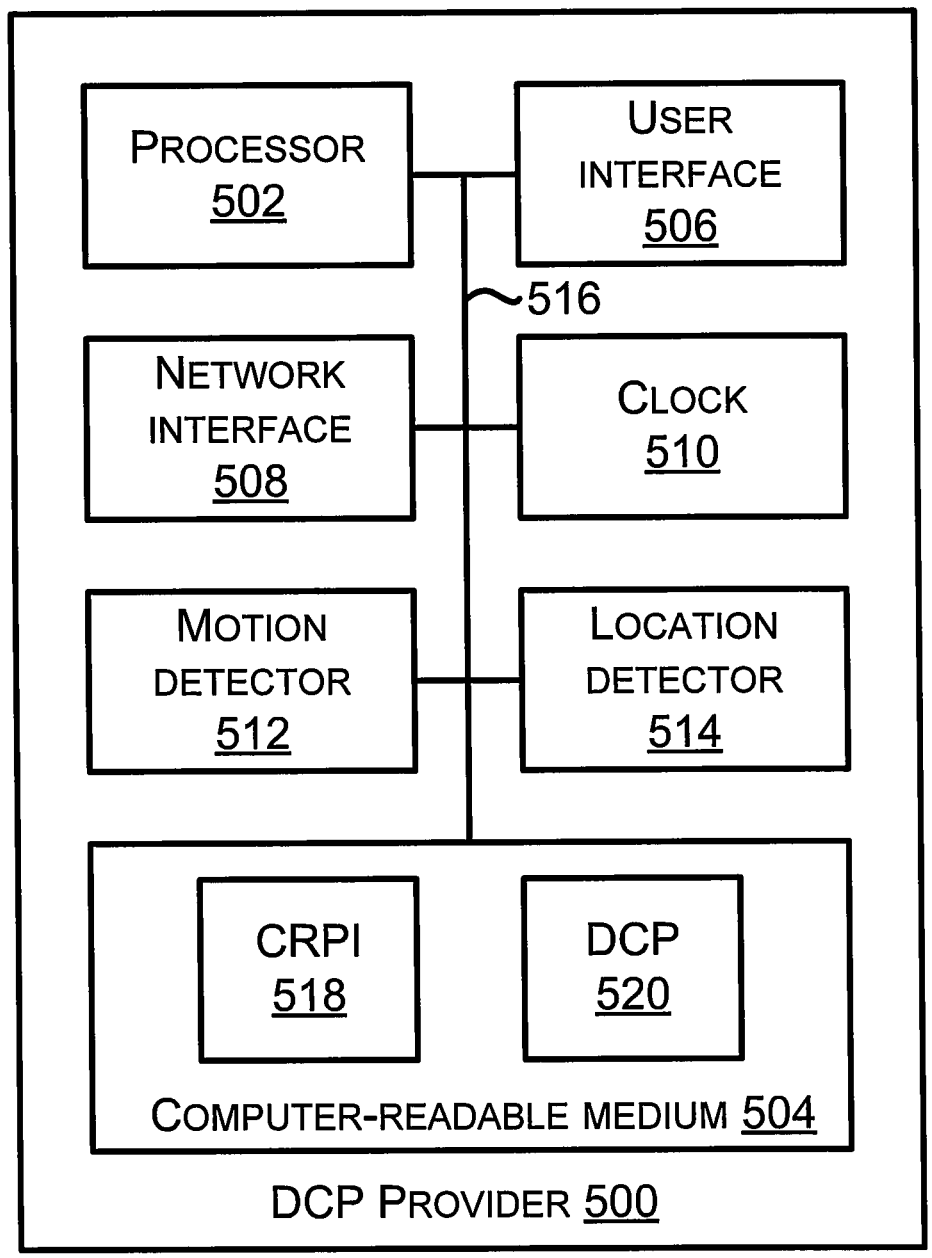
FIG. 5 is a block diagram showing a DCP provider device.

Next, FIG. 5 is a block diagram of a DCP provider 500. One or more of DCP providers 106, 108, 110, and 112 can be configured like at least a portion of the DCP provider 500. In that regard, one or more of the DCP providers 106, 108, 110, and 112 may include all or only a portion of the components of the DCP provider 500.

The DCP provider 500 includes a processor 502, a computer-readable medium 504, a user interface 506, a network interface 508, a clock 510, a motion detector 512, and a location detector 514, two or more of which can be communicatively coupled or linked together via a system bus, network, or other connection mechanism 516. The computer-readable medium 504 can store CRPI 518, DCP 520, and other data, but is not so limited. The processor 502 can execute the CRPI 518. Any or all of the remarks above regarding, in general, a processor, a computer-readable medium, a user interface, a network interface, a clock, a motion detector, and a location detector, are applicable to the processor 502, the computer-readable medium 504, the user interface 506, the network interface 508, the clock 510, the motion detector 512, and the location detector 514 respectively.

The CRPI 518 can include program instructions to receive messages including DCP, extract the DCP from the received messages, correlate the extracted DCP with other data (e.g., time data provided by the clock 510), or store the DCP within the DCP 520. In addition to time data, the DCP stored within the DCP 520 can include data corresponding to location or motion data.

The CRPI 518 can include program instructions to determine DCP (i.e., DCP determination CRPI). For example, the DCP determination CRPI can determine the DCP based on data determined or provided by the motion detector 512 or the location detector 514.

The network interface 508 can receive parameters storable as DCP within the DCP 520. The network interface 508 can provide the received parameters (e.g., to the processor 500, the computer-readable medium 504 or the connection mechanism 512) for storage within the DCP 520. The received parameters can include time data or the processor 500 can correlate time data with the received parameters for storage within the DCP 520.

The network interface 508 can receive, over the network 118 from TDS computing device 114, a DCP request. The DCP request can include, but is not limited to, a time identifier, a location identifier, a quantity identifier, and a time interval identifier. The time identifier can include a start time, an end time, or a time range including the start time and the end time, but is not so limited. The location identifier can include data to identify a given area, such as a zip code to identify an area associated with the zip code or a set of GPS locations to identify an area associated with a path traveled by a vehicle, but is not so limited. The quantity identifier can, for example, identify a minimum or maximum number of DCP to provide (e.g., 100 DCP). The time interval identifier can, for example, identify a time interval (e.g., 5 or 30 seconds) to identify a desired timing between two consecutive DCP.

The CRPI 518 can include program instructions that cause the network interface 508 to transmit DCP in response to a DCP request. The network interface 508 can transmit, over the network 118 to the TDS computing device 114 or another device that transmitted the DCP request, the requested DCP in response to the DCP request.

The user interface 506 can be used to enter DCP for storage with the DCP 520. The user interface 506 can present data pertaining to creating, storing, and providing DCP.

The DCP provider 500 can include or be configured as a desktop or laptop computing device that includes one or more of the components of the DCP provider 500 shown in FIG. 5. The DCP provider 500 can include or be configured as a diagnostic device or system, such as a MODIS™ ultra integrated diagnostic system or with components thereof. Moreover, the output UI elements of the user interface 506 can be configured like a ten inch high-resolution touch screen display that is part of the Versus® Pro Diagnostic Information System, but are not so limited. The DCP provider 500 can include or be configured as a smartphone or a tablet device. The CRPI 518 of the DCP provider 500 including or configured as a smartphone or a tablet device can include an application downloaded to the TDS presentation device from the APP STORE® online retail store or from the GOOGLE PLAY® online retail store.

III. Example VDV and DCP

The data collector 104 can be configured to request, receive, or store any of a variety of VDV that are available from a vehicle. The available VDV from a vehicle can be based on various vehicle characteristics such as, but not limited to, the year, make, and model of the vehicle, and the components (e.g., an engine with a particular displacement or a transmission type (e.g., manual or automatic)) within the vehicle. The values of the VDV provided by a vehicle can be based on various driving circumstances such as, but not limited to, how the vehicle is being driven, where the vehicle is being driven, and meteorological circumstances. A VDV can also be provided by a vehicle that is not being driven. For example, a VDV can be provided by a vehicle parked and idling in a parking lot or within a vehicle repair shop.

The data collector 104 can transmit VDV requests to the vehicle 102. A VDV request can include an ECU identifier, a source identifier, or a vehicle PID, but is not so limited. An ECU identifier transmitted on the vehicle communication link 134 allows the ECU receiving the VDV request to determine whether the ECU is to respond to the VDV request. An ECU can use the source identifier in the VDV request as a destination of a VDV request response. An ECU can use the vehicle PID to determine which VDV to include in the VDV request response.

FIG. 10 shows an example set of VDV requests 1000 including VDV requests 1002, 1004, 1006, 1008, 1010, and 1012. Each of those VDV requests is destined for an engine ECU within the vehicle 102 and is sourced by the data collector 104. Each of the VDV requests 1002 to 1012 include a Mode number (e.g., an OBD II Mode number). Mode [1] can represent a request for VDV. Mode [3] can represent a request for DTC. A VDV request can include other modes as well, or no modes at all. The destination of a VDV request can be for an ECU other than an engine ECU. Each of the VDV requests 1002, 1004, 1008, and 1010 include a PID. PID [04] can identify a calculated engine load value as a percentage between 0 and 100 percent inclusive.

PID [05] can identify an engine coolant temperature VDV in degrees centigrade. PID [0F] can identify an intake air temperature VDV in degrees centigrade. A VDV request can include a different PID than those shown in FIG. 10. The VDV requests 1006 and 1010 are examples of VDV requests without a PID.

A device, such as the data collector 104 or the TDS computing device 114, can be configured to determine, request, receive or store any of a variety of DCP that can be associated with a VDV, such as the VDV requested, received, or stored by the data collector 104. In one respect, the data collector 104 can associate the VDV and DCP when the data collector 104 receives the VDV or when the data collector 104 stores the VDV as part of the VDV 320. In another respect, the data collector 104 can associate the VDV and DCP after the data collector 104 receives and stores the VDV. In yet another respect, the TDS computing device 114 can request and receive the DCP and then associate the DCP with the VDV instead of or in addition to the data collector 104.

The VDV request response provided by a vehicle can include a VDV identifier (e.g., a PID) and the VDV. The VDV request response provided by a vehicle can include a time stamp associated with the VDV (e.g., a time the VDV was captured or transmitted by the vehicle 102 to the data collector 104). Additionally or alternatively, the data collector 104 can associate a time with the VDV such as a time when the data collector 104 receives or stores the VDV.

FIG. 10 shows an example set of VDV 1014 including VDV 1016, 1018, 1020, 1022, 1024, and 1026. For the VDV 1020 and 1026, a VDV type (i.e., the type of VDV) is identified by the Mode (e.g., Mode [3]) and the VDV are within the Data-1 and Data-2 values. For the VDV 1016, 1018, 1022, and 1024, the VDV type is identified by the mode (i.e., Mode [1]) and the Data-1 value (e.g., PID [05] or [0F]), and the VDV is shown by the Data-2 value. The null values for Data-1 and Data-2 for VDV 1020 can indicate that no DTC is set by the engine ECU.

FIG. 10 shows each of the VDV 1016 to 1026 including a response identifier (e.g., 1 to 6) that corresponds to a request identifier (e.g., 1 to 6 in the VDV requests 1002 to 1012). The VDV 1016 to 1026 also include a destination identifier for the data collector 104, a source identifier for the engine ECU.

Figure 11:
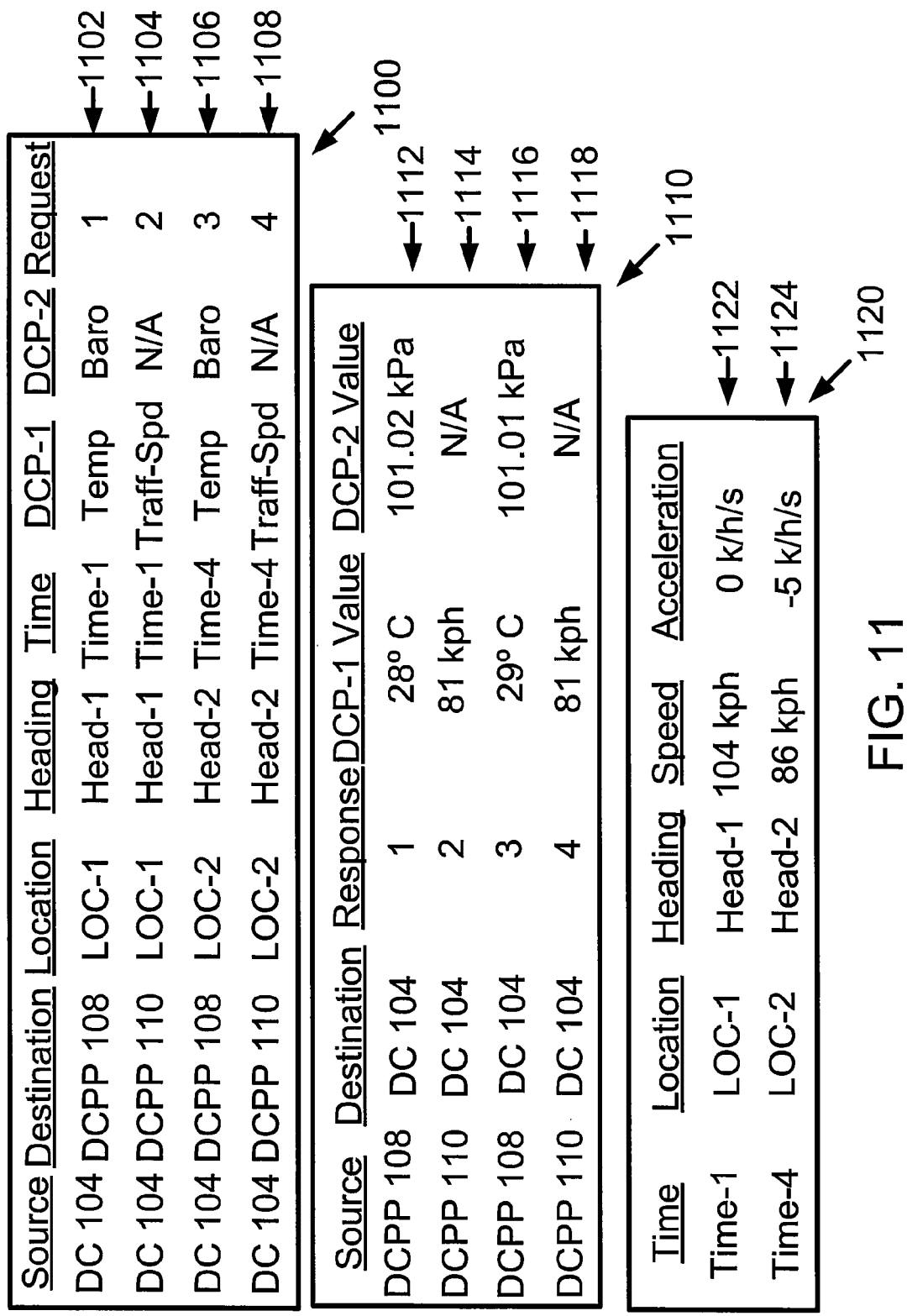
FIG. 11 shows DCP in accordance with the example embodiments described herein.

Next, FIG. 11 shows a set of DCP requests 1100, a set of DCP request responses 1110, and a set of DCP 1120 in accordance with the example embodiments. The set of DCP 1120 can include DCP determined locally to the data collector 104, such as DCP determined by the data collector 104 or by DCP provider 106. The set of DCP 1120 includes DCP 1122 associated with a first time (i.e., time 1) and DCP 1124 associated with a second time (i.e., time 4). An associated time could include a date identifier (e.g., an identifier of Jan. 1, 2016) and a time identifier (e.g., 7:30 AM Pacific Standard Time). The DCP 1122 and DCP 1124 include DCP that indicate a location identifier, a heading identifier, a speed value, and an acceleration value. The heading identifier can include a direction (e.g., north, south or northwest) or other information to indicate a heading of the vehicle 102.

The set of requests for DCP 1100 includes DCP requests 1102, 1104, 1106, and 1108. A DCP request can include a source identifier, a destination identifier, a location, a heading, a time, a DCP identifier, and a request number, but is not so limited. The set of DCP request responses 1110 includes DCP request responses 1112, 1114, 1116, and 1118. A DCP request response can include a source identifier, a destination identifier, a response identifier (e.g., 1 to 4 that corresponds to a request identifier 1 to 4 respectively of DCP requests 1102 to 1108), and a DCP value, but is not so limited. The data collector 104 or another device can determine VDV and DCP associated with a common time and associate those VDV and DCP.

As an example, the DCP-1 values and the DCP-2 values of DCP request responses 1112 and 1114 are associated with time Time-1 (based on requests 1 and 2), the DCP values of DCP 1122 are associated with time Time-1, and the VDVs of VDV request responses 1016 is associated with time Time-1. All of those parameters or some portion thereof can be associated with each other.

The VDV of VDV request responses 1018 and 1020 are associated with times Time-2 and Time-3 respectively. The data collector 104 or TDS computing device 114 can determine that times Time-2 and Time-3 are within a threshold amount of time from time Time-1 and responsively associate the VDV of VDV request responses 1018 and 1020 to the DCP and VDV associated with time Time-1. In that way, TDS computing device 114 can use that associated data to determine that the engine ECU did not have any DTC set when the vehicle was located at location LOC-1 or a location approximate to LOC-1.

As another example, the DCP-1 values and the DCP-2 values of DCP request responses 1116 and 1118 are associated with time Time-4 (based on requests 3 and 4), the DCP values of DCP 1124 are associated with time Time-4, and the VDVs of VDV request responses 1022 is associated with time Time-4. All of those parameters or some portion thereof can be associated with each other.

The VDVs of VDV request responses 1024 and 1026 are associated with times Time-5 and Time-6 respectively. The data collector 104 or TDS computing device 114 can determine that times Time-5 and Time-6 are within a threshold amount of time from time Time-4 and responsively associate the VDV of VDV request responses 1024 and 1026 to the DCP and VDV associated with time Time-4. In that way, TDS computing device 114 can use that associated data to determine that the engine ECU had set DTC P0115 and DTC P0116 when the vehicle was located at location LOC-2 or a location approximate to LOC-2.

IV. Example Operation

Figure 6:
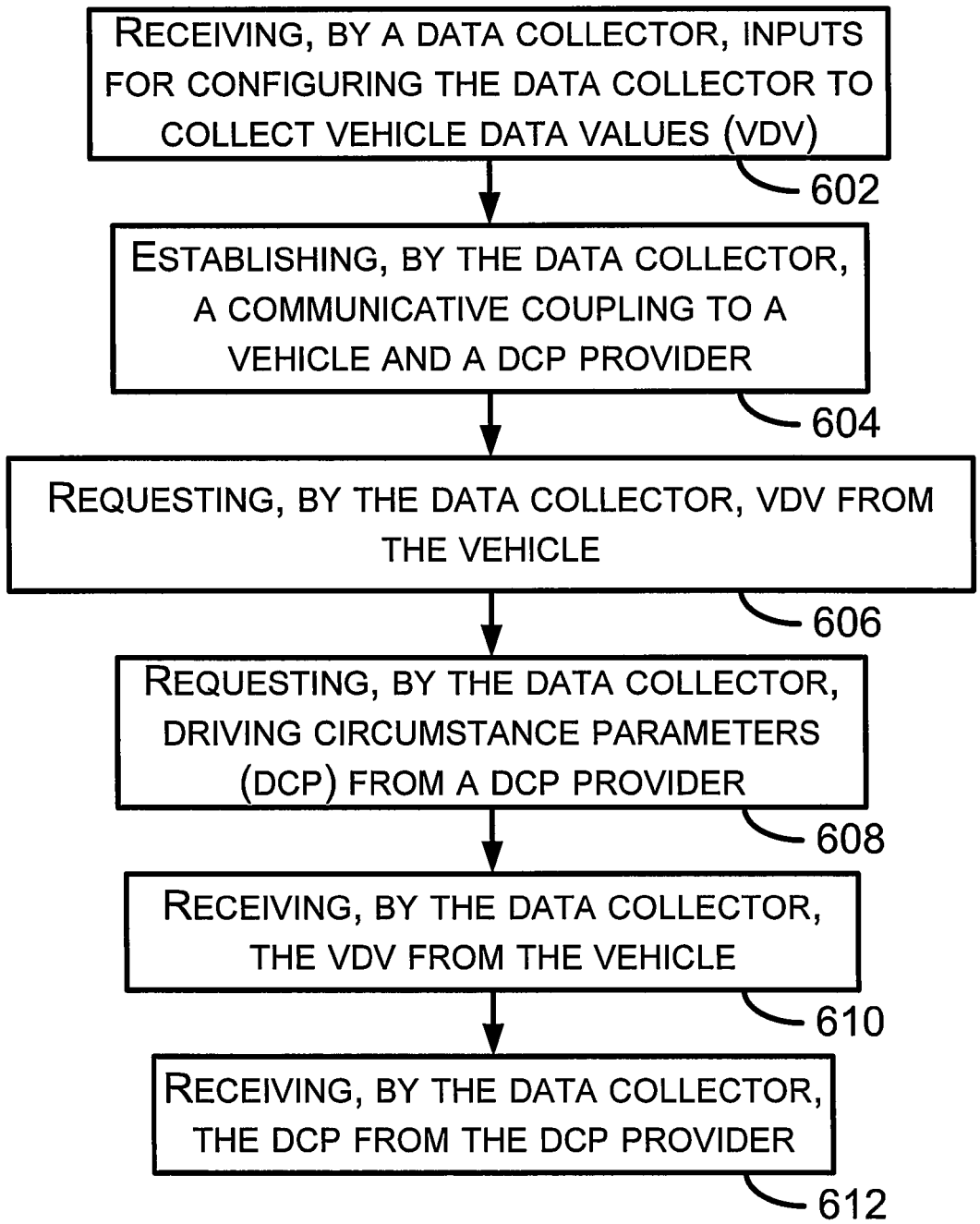
FIG. 6 is a flowchart depicting a set of functions that can be carried out in accordance with one or more example embodiments.

Next, FIG. 6 is a flowchart depicting a set of functions 600 (or more simply "the set 600") that can be carried out in accordance with one or more example embodiments described herein. The set 600 includes the functions shown in blocks labeled with even numbers 602 through 612 inclusive. The following description of the set 600 includes references to elements shown in other figures in this application, but the functions of the set 600 are not limited to be carried out by the referenced elements. A variety of methods can be performed using one or more of the functions shown in the set 600 and one or more other functions described herein, such as, but not limited to, one or more of the functions shown in FIG. 7, FIG. 8, or FIG. 9.

Block 602 includes receiving, by the data collector 104, inputs for configuring the data collector 104 to collect VDV. These inputs can include a DCCI. The data collector 104 can receive DCCI that are entered by use of the user interface 304. For example, the DCCI can include one or more PID, DTC, vehicle identifier, vehicle system identifier, or symptom data (e.g., C/C/C data) entered by use of the user interface 304. Additionally or alternatively, the data collector 104 can receive DCCI from the network interface 314. For example, the DCCI can include one or more PID, DTC, vehicle identifier, vehicle system identifier, or symptom data transmitted to the data collector 104 over the network 118 from another network device, such as a data collector used by a service advisor to input data regarding the vehicle 102. The data collector 104 can also receive DCCI from the vehicle 102. For example, the data collector 104 can request a VIN from the vehicle 102 and a VIN returned in response to that request can be used as DCCI to determine which protocols and messages are applicable to requesting VDV from the vehicle 102.

Receiving the DCCI can also include receiving the DCCI from the computer-readable medium 302. The processor 300 can execute the CRPI 318 to determine the DCCI within computer-readable medium based on, at least in part, other DCCI received by the data collector 104. For example, the processor 300 can determine one or more VDV to request from the vehicle 102 based on the DCCI including vehicle identification data and symptom data regarding the vehicle 102. For example, if the symptom data indicates a Check Engine Light is on within the vehicle 102 and the temperature gauge within the vehicle is malfunctioning, processor 300 can determine that OBD II Mode [01], PID [05], for engine coolant temperature, and OBD II Mode [03] for requesting DTC are applicable VDV to request for a vehicle identified by and exhibiting symptoms based on the DCCI including the vehicle identification data and symptom data regarding the vehicle 102.

Next, block 604 includes establishing, by the data collector 104, a communicative coupling to the vehicle 102 and a DCP provider. The established communicative coupling between the data collector 104 and the vehicle 102 can include a wired or wireless connection between the data collector 104 and the vehicle 102. The wired connection can include a power connection that provides operational power for the data collector 104 from a battery in the vehicle 102 to the data collector 104. Establishing the communicative coupling can include connecting vehicle interface link 126 to the vehicle 102 and the data collector 104.

Similarly, the established communicative coupling between the data collector 104 and a DCP provider, such as DCP provider 106, can include a wired or wireless connection between the data collector 104 and the DCP provider. The wired connection can include a power connection that provides operational power from one of the data collector 104 and the DCP provider to the other. Establishing the communicative coupling between the data collector 104 and the DCP provider can include connecting the local communication link 122 to the data collector 104 and the DCP provider 106.

Next, block 606 includes requesting, by the data collector 104, VDV from the vehicle 102. Requesting the VDV can include the vehicle interface 312 transmitting one or more requests for VDV to the vehicle 102 over the vehicle interface link 126. The requested VDV can be based on, at least in part, the DCCI received at block 602. For VDV in accordance with OBD II diagnostics, a VDV request can include a Mode number or a PID, as shown in FIG. 10. The VDV is not restricted to OBD II diagnostic parameters. For example, the VDV could include VDV from an entertainment system, a supplemental inflatable restraint system, or some other non-emission related ECU or system within the vehicle 102.

Next, block 608 includes requesting, by the data collector 104, DCP from a DCP provider. The DCP requested at block 608 can include, but are not limited to, traffic condition parameters pertaining to paths followed by the vehicle 102 when the DCP are captured, meteorological parameters pertaining to a location of the vehicle 102 when the DCP are captured, location parameters of the vehicle 102 when the DCP are captured, or motion parameters pertaining to the vehicle 102 when the DCP are captured.

Requesting the DCP can include the data collector 104 transmitting a DCP request to the DCP provider 106 over the local communication link 122 or to DCP provider 108, 110, or 112 over the network 118. In one respect, a DCP request can include an identifier of the data collector 104 (e.g., the source data in DCP request 1102) such that the DCP provider knows where to transmit the DCP requested by the data collector 104. In another respect, a DCP request can include a request for a subset of DCP that the DCP provider can provide to the data collector 104. For instance, if DCP provider 108 can provide the meteorological DCP values described above, the DCP request may include a request for just the temperature and barometric values from the DCP provider 108. In yet another respect, a DCP request can include a location identifier, such as a location identifier that indicates a location of the vehicle 102. As the location of the vehicle 102 changes, the data collector 104 can send another DCP request based on the new location.

Referring to the DCP requests 1100 to 1108, each request can identify a source of the request (e.g., the data collector 104) and destination of the request (e.g., DCP provider 108 or 110). When a DCP provider is communicatively coupled locally to the data collector 104, such as the DCP provider 106, a source and destination may be implied by a DCP request. As shown in FIG. 11, a DCP request can indicate which DCP are to be provided (e.g., temperature and barometric values for DCP requests 1102 and 1104, and a traffic speed (e.g., an average traffic speed) for DCP requests 1104 and 1108).

Next, block 610 includes receiving, by the data collector 104, the VDV from the vehicle 102. Receiving the VDV can include vehicle interface 312 receiving VDV that the vehicle 102 transmits over vehicle communication link 126.

Next, block 612 includes receiving, by the data collector 104, the DCP from the DCP provider. Receiving the VDV can include the network interface 314 receiving VDV that the DCP provider 106 transmits over the local communication link 122 or that any of the DCP providers 108, 110, or 112 transmit over the network 118 to the data collector 104.

Figure 7:
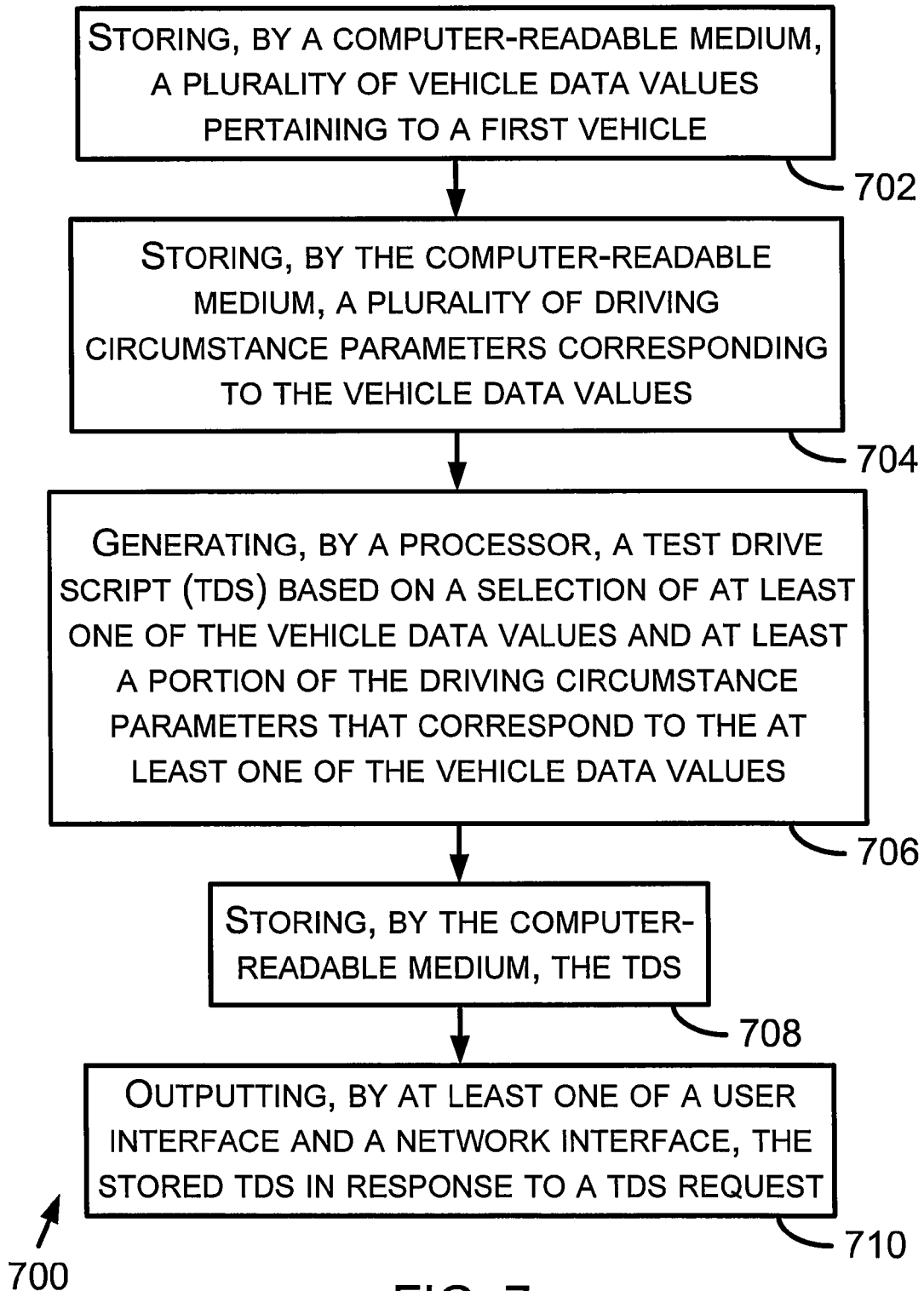
FIG. 7 is a flowchart depicting another set of functions that can be carried out in accordance with one or more example embodiments.

Next, FIG. 7 is a flowchart depicting a set of functions 700 (or more simply "the set 700") that can be carried out in accordance with one or more example embodiments described herein. The set 700 includes the functions shown in blocks labeled with even numbers 702 through 710 inclusive. The following description of the set 700 includes references to elements shown in other figures in this application, but the functions of the set 700 are not limited to be carried out by the referenced elements. A variety of methods can be performed using one or more of the functions shown in the set 700 and one or more other functions described herein, such as, but not limited to, one or more of the functions shown in FIG. 6, FIG. 8, or FIG. 9.

Block 702 includes storing, by a computer-readable medium, a plurality of VDV pertaining to a first vehicle, such as the vehicle 102. Storing the VDV can include the computer-readable medium 318 storing the VDV that the data collector 104 receives from the vehicle 102, as described in block 610. Additionally or alternatively, storing the VDV can include the computer-readable medium 202 storing the VDV that the TDS computing device 114 receives from the data collector 104 (e.g., some or all of the VDV stored in VDV 320). The VDV stored at block 702 can include VDV obtained from the vehicle 102, such as, but not limited to, DTC, PID, and PID values. Additionally or alternatively, the VDV stored at block 702 can include electrical measurements of a component installed within a vehicle.

Storing the plurality of VDV can include storing data associated with the plurality of VDV. In general, the data associated with the VDV can include data that a device, such as the data collector 104 or TDS computing device 114, can use to determine DCP that correspond to the VDV. As an example, the data associated with the VDV can include a time value, such as a time value indicating when the VDV was generated or received, or a location value, such as a location of the vehicle 102 when the VDV was generated or a location of the data collector 104 when the VDV was received by the data collector 104. The data associated with the VDV can include a vehicle identifier (e.g., a VIN) of the vehicle 102.

Next, block 704 includes storing, by the computer readable medium, a plurality of DCP corresponding to the VDV. Storing the DCP can include the computer-readable medium 302 storing the DCP determined by the data collector 104, storing DCP determined by a local DCP provider 106, or storing DCP determined by a remote DCP provider 108, 110, or 112. Additionally or alternatively, storing the DCP can include the computer-readable medium 202 storing the DCP that the TDS computing device 114 receives from the data collector 104 (e.g., some or all of the DCP stored in DCP 322). The DCP stored at block 704 can include, but are not limited to, traffic condition parameters, meteorological parameters, location parameters, and motion parameters.

Storing the DCP can include storing data associated with the DCP. In general, the data associated with the DCP can include data a device, such as the data collector 104 or the TDS computing device 114, can use to determine VDV that correspond to the DCP. Some or all of the types of data that can be associated with the VDV, as described above, can be associated with the DCP.

Next, block 706 includes generating, by the processor 200, a TDS based on a selection of at least one of the VDV and a least a portion of the DCP that correspond to the at least one of the VDV. The processor 200 can select the at least one VDV based on data within a TDS request. The data within the TDS request can include at least a portion of the C/C/C from a repair order pertaining to servicing the vehicle 102. As an example, the data within the TDS request can include a DTC identifier (e.g., P0115 or P0116) or a PID (e.g., PID 05). As another example, the complaint portion of the repair order can include text that indicates a check engine light is on the vehicle 102 and the coolant gauge is malfunctioning.

Figure 8:
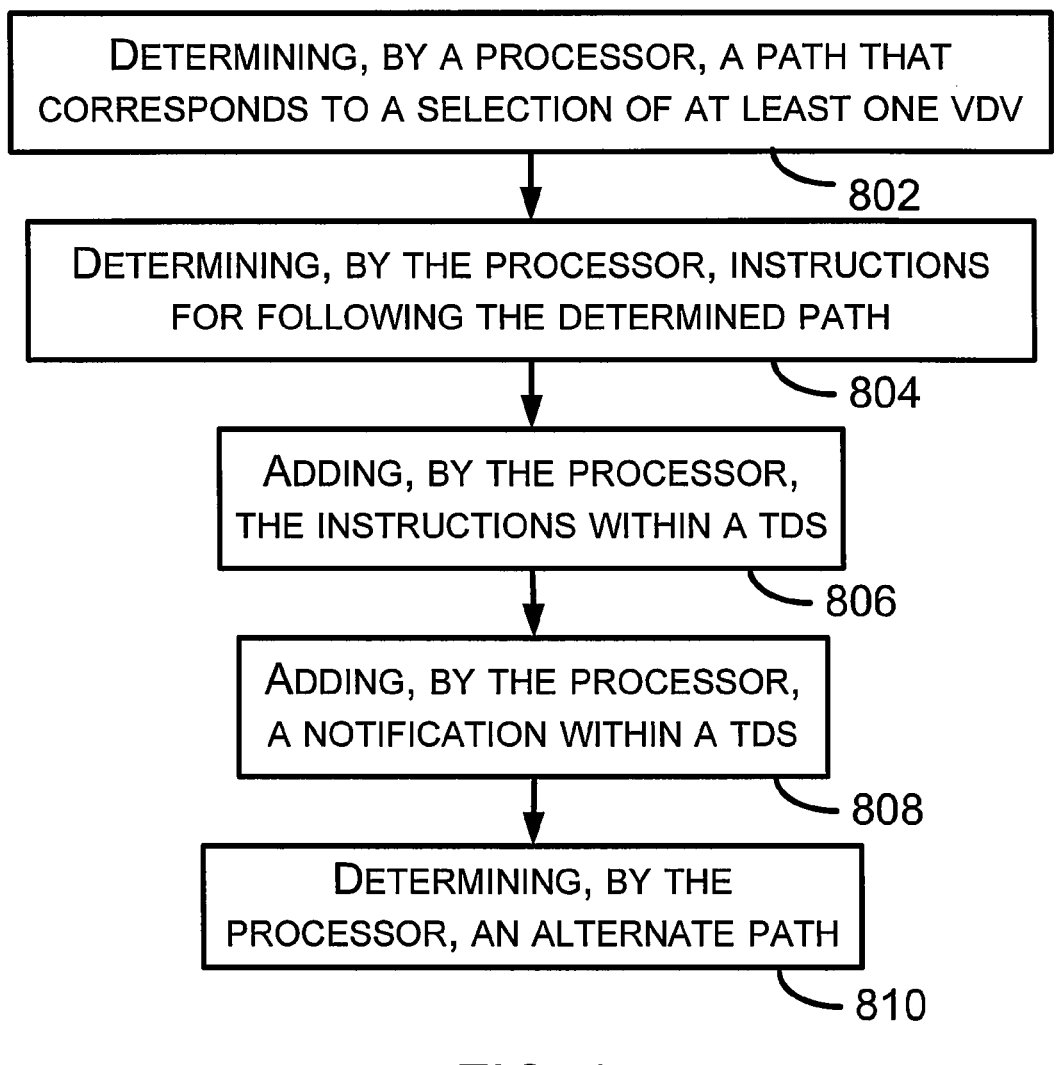
FIG. 8 is a flowchart depicting another set of functions that can be carried out in accordance with one or more example embodiments.

In a first respect, the processor 200 can select the at least one VDV based on a DTC set (i.e., active) within the vehicle 102. In the first respect, the at least one VDV can include a first VDV that indicates a DTC has been set in the vehicle and some VDV captured prior to that first VDV and some VDV captured after that first VDV. In a second respect, the processor 200 can select the at least one VDV based on a VDV that exceeds a threshold VDV. In the second respect, the at least one VDV can include a second VDV including a VDV that exceeds the threshold VDV and some VDV captured prior to that second VDV and some VDV captured after that second VDV. Additional details pertaining to generating a TDS are shown in FIG. 8.

Next, block 708 includes storing, by the computer-readable medium, the TDS. Storing the TDS can include the computer-readable medium 202 storing a TDS (generated at block 706) within the TDS 212.

Next, block 710 includes outputting, by at least one of the user interface 204 and the network interface 206, the stored TDS in response to a TDS request. Outputting the TDS by the user interface 206 can include displaying a visual portion of the TDS or playing an audible portion of the TDS. Outputting the TDS by the network interface 206 can include the network interface 206 transmitting the TDS over the network 118 to another device (e.g., TDS presentation device 116).

In an alternative arrangement, generating the TDS (at block 706) can be based on selection of a vehicle identifier and a C/C/C associated with the vehicle. The processor 200 can retrieve data from the database 120 to generate the TDS based on the vehicle identifier (e.g., Y/M/M-1) and a C/C/C (e.g., DTC P0301). The processor 200 can generate the TDS based on VDV that indicate a sequence of multiple PID values for engine RPM and intake MAP. The database 120 can include load instructions that indicate how a vehicle such as the vehicle 102 or 136 can be loaded such that the vehicle is operated at the engine RPM and intake MAP indicated by the sequence of multiple PID values indicated by the TDS. The load instructions may indicate a transmission gear, an accessory state (e.g., vehicle air conditioning (AC) on or off), and a throttle position, but are not so limited. A TDS generated in this alternative manner can include the sequence of VDV and the load instructions as shown in example TDS data within Table 2. A TDS generated in this alternative manner can include a different number of time sequence values, VDVs, and load instructions than shown in Table 2.

TABLE 2

| Time    | Engine RPM | Intake MAP (kPa) | Load instruction(s)                  |
|---------|------------|------------------|--------------------------------------|
| 0:00.00 | 0          | 0                | Start vehicle, Transmission in Park  |
| 0:05.00 | 750        | 50               | Open throttle wider, Turn AC on      |
| 0:10.00 | 750        | 50               | Throttle steady                      |
| 0:15.00 | 1,000      | 55               | Open throttle wider                  |
| 0:20.00 | 1,000      | 53               | Throttle steady                      |
| 0:25.00 | 1,250      | 56               | Turn AC off                          |

Next, FIG. 8 is a flowchart depicting a set of functions 800 (or more simply "the set 800") that can be carried out in accordance with one or more example embodiments described herein. The set 800 includes the functions shown in blocks labeled with even numbers 802 through 810 inclusive. The following description of the set 800 includes references to elements shown in other figures in this application, but the functions of the set 800 are not limited to be carried out by the referenced elements. A variety of methods can be performed using one or more of the functions shown in the set 800 and one or more other functions described herein, such as, but not limited to, one or more of the functions shown in FIG. 6, FIG. 7, or FIG. 9.

Figure 12:
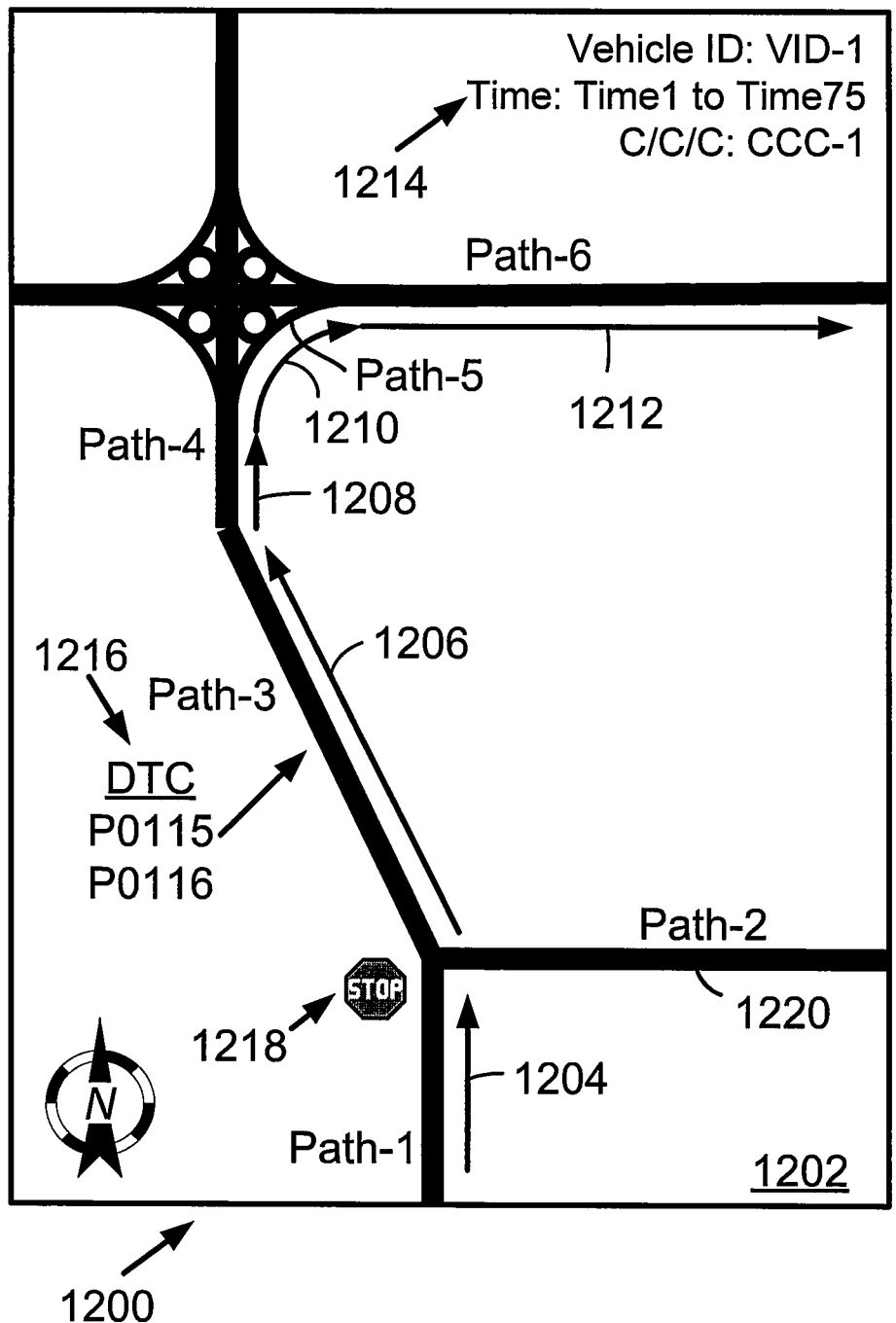
FIG. 12 shows aspects of a TDS in accordance with the example embodiments described herein.

Block 802 includes determining, by the processor 200, a path that corresponds to a selection of at least one VDV (e.g., the at least one VDV selection discussed with respect to block 706). The processor 200 can execute CRPI 210 to cause the network interface 206 to transmit location identifiers associated with the at least one VDV to the DCP provider 112 to request path data regarding the location identifiers. In response to that request for path data, the DCP provider 112 can transmit path data that indicates one or more paths corresponding to the location identifiers. The path data can include, but is not limited to, road names and a map showing the paths associate with the road names. The path data can indicate explicitly or impliedly an order of multiple paths (e.g., Path-1 (1204), Path-3 (1206), Path-4 (1208), Path-5 (1210), and Path-6 (1212), as shown in FIG. 12).

Block 804 includes determining, by processor 200, instructions for following the determined path (e.g., follow-path instructions). The DCP provider 112 can transmit the follow-path instructions to the TDS computing device 114. The follow-path instructions can indicate explicitly or impliedly an order of the follow-path instructions. With reference to FIG. 12, the follow-path instructions could include instructions such as, but not limited to, (i) proceed north on Path-1, (ii) stop at the intersection of Path-1, Path-2, and Path-3, (iii) proceed northwest on Path-3, (iv) continue north on Path-4, (v) veer right onto Path-5 and then proceed East on Path-6. The VDV including motion values determined by the motion detector 306 can be used to determine follow-path instructions that indicate a speed, an acceleration level, or a braking level.

Block 806 includes adding, by processor 200, the instructions within a TDS. As an example, the processor 200 can first allocate a portion of the computer-readable medium 202 (e.g., a portion of the TDS 212) for storage of the TDS, and add descriptors to the TDS, such as the descriptors 1214 shown in FIG. 12. The processor 200 can then add the follow-path instructions to the TDS. The processor 200 can add a map to the TDS, such as map 1202 showing the determined paths.

In some cases, the TDS presentation device 116 may be at a first location away from a starting point of the determined path the vehicle followed. The processor 200 can determine a start path from the first location to a starting point of the determined path. The processor 200 can add the start path (e.g., follow-path instructions, notifications, and a map corresponding to the start path) to the TDS. The follow-path instructions for the start path can be added prior to the follow-path instructions for the determined path the vehicle followed.

In those same cases or other cases, a user of the TDS presentation device 116 may desire to return to the first location or go to a second location after traveling along the determined path the vehicle followed. The processor 200 can determine a return path from an intermediate or ending point of the determined path the vehicle followed to the first location or the second location. The processor 200 can add the return path (e.g., follow-path instructions, notifications, and a map corresponding to the return path) to the TDS. The follow-path instructions for the return path can be added after the follow-path instructions for the determined path the vehicle followed.

Block 808 includes, adding, by the processor 200, a notification within the TDS. The notification can include a notice regarding a VDV, a DCP or the TDS. The user interface 404 can present a TDS notification visually or audibly. As an example, the notification can include a notification 1216 (shown in FIG. 12) regarding two DTC that were set along a particular point of Path-3 1206. The notification can alert a user of the TDS presentation device 116 regarding a location where the two DTC were set by a vehicle. In a similar manner, a notification could alert a user to locations along a path at which the vehicle provided VDV that exceeded a threshold value or fell within a certain range of VDV. As another example, the notification can include a notification 1218 (shown in FIG. 12) regarding a path circumstance, such as occurrence of a stop sign along Path-1. Other examples of the notification are also possible.

Block 810 includes determining, by the processor 200, an alternate path. The alternate path can be different than the baseline path, but have at least one path characteristic that matches or approximates a path characteristic of the baseline path. An approximate path characteristic can be one that falls within a range of path characteristics of the baseline path. For example, an approximate path speed characteristic can be a speed within 5 kilometers per hour (kph), 10 kph, 15 kph, 20 kph or another number of kph of the baseline path speed characteristic (e.g., a 45 kph speed limit on the baseline path). As another example, an approximate path grade characteristic can be a maximum change in grade per distance such as, but not limited to, 10 meters per kilometer (mpk), 15 mpk, 20 mpk, 25 mpk, or 30 mpk. As another example, an approximate path curvature can be a maximum turn in degrees per kilometer (dpk), such as, but not limited to, 10 dpk, 15, dpk, or 20 dpk. The path characteristics can have units other than the example units listed above.

The processor 200 can receive a location identifier and a distance range within a TDS request. The location identifier can indicate a location of the TDS presenter 116. The distance range can indicate, for example, (i) a maximum distance the technician is willing to drive to get to a starting point of a baseline or alternate path, or (ii) a maximum distance the technician is willing to drive to get to the starting point of the baseline or alternate path, to drive the baseline or alternate path, and to drive from an ending point of the baseline or alternate path back to the technician's repair shop or other location.

The processor 200 can request and receive from the DCP provider 112 path characteristics pertaining to the baseline path. The processor 200 can request and receive from the DCP provider 112 path characteristics of paths at or proximate to the location identified by the location identifier, and determine whether any of those paths have characteristics that match or approximately match the path characteristics of the baseline path. The processor 200 can determine the alternate path using some or all of the paths, at or proximate to the location identified by the location identifier, that have characteristics that match or approximately match the path characteristics of the baseline path.

Determining the alternate path can include the processor 200 determining notifications, follow-path instructions for the alternate path, a start path with follow-path instructions, a return-path with follow-path instructions, and a map, among other aspects of an alternate path, and then adding any of the items to a TDS pertaining to the alternate path.

Figure 9:
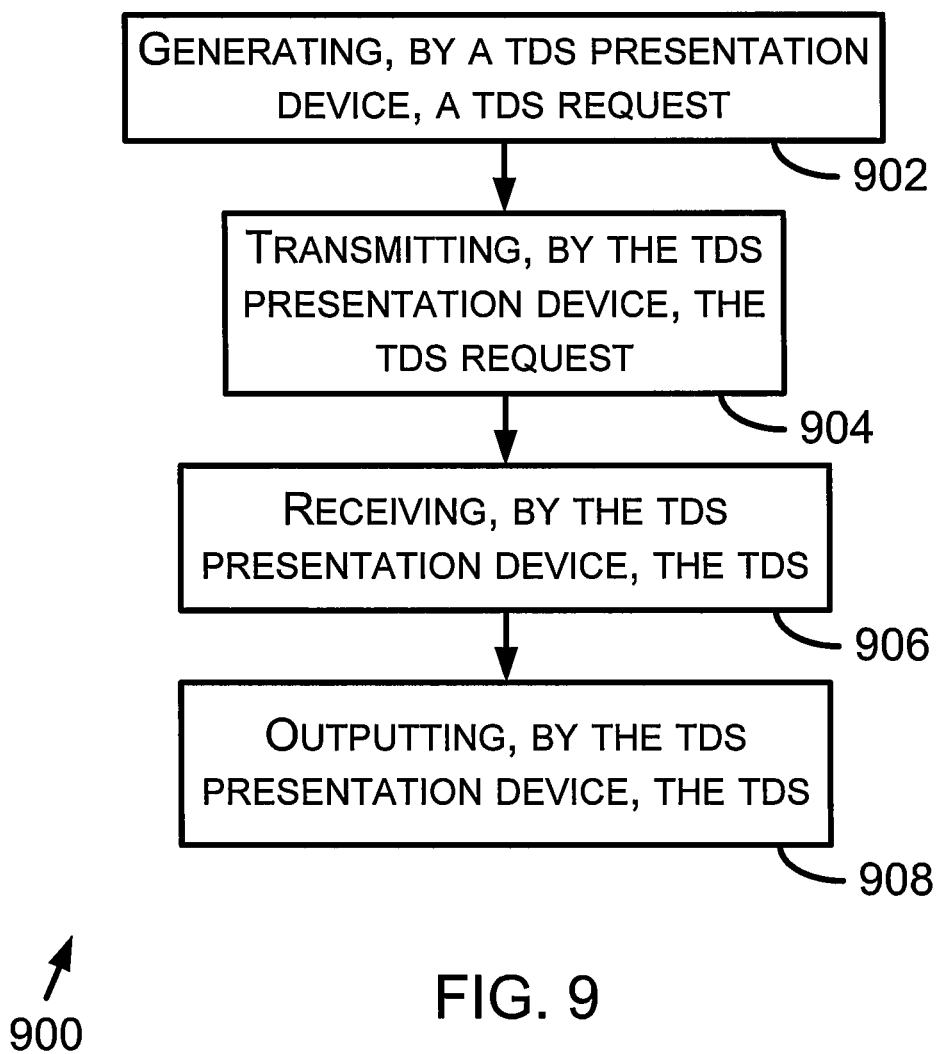
FIG. 9 is a flowchart depicting another set of functions that can be carried out in accordance with one or more example embodiments.

Next, FIG. 9 is a flowchart depicting a set of functions 900 (or more simply "the set 900") that can be carried out in accordance with one or more example embodiments described herein. The set 900 includes the functions shown in blocks labeled with even numbers 902 through 908 inclusive. The following description of the set 900 includes references to elements shown in other figures in this application, but the functions of the set 900 are not limited to be carried out by the referenced elements. A variety of methods can be performed using one or more of the functions shown in the set 900 and one or more other functions described herein, such as, but not limited to, one or more of the functions shown in FIG. 6, FIG. 7, or FIG. 8.

Block 902 includes generating, by the TDS presentation device 116, a TDS request. A TDS request can include a vehicle identifier for selection of a TDS pertaining to a vehicle corresponding to at least a portion of the vehicle identifier. As an example, the vehicle identifier can include a VIN of a vehicle-under-service or a portion of the VIN. The selection of the TDS can be based on a year, make, and model indicated by the VIN or a portion thereof. The vehicle identifier can include the year, make, or model selected from a list of selectable vehicle identifiers. The vehicle identifier can be entered by use of the user interface 404 or received by the network interface 406 or the vehicle interface 414. The vehicle identifier is not limited to a VIN, year, make, and model, but can include other information such as vehicle accessories, regular production option (RPO) codes, etcetera.

A TDS request can include a use value for selection of a TDS pertaining to a vehicle associated with an identical or similar use value. As an example, the use value can include a distance value (e.g., miles or kilometers) or a time value (e.g., hours) that indicate an amount of use of the vehicle-under-service. The use value can be entered by use of the user interface 404 or received by the network interface 406 or the vehicle interface 414.

A TDS request can include a location identifier of the vehicle-under-service for selection of a TDS that includes instructions for driving a vehicle-under-service on paths proximate a location indicated by the location identifier. The location identifier can be entered by use of the user interface 404, received by the network interface 406, or determined by the processor 400 without use of the user interface 404 and the network interface 406.

A TDS request can include at least one of a C/C/C associated with the vehicle-under-service for selection of a TDS associated with a vehicle that had a similar C/C/C while under service. The C/C/C of the TDS request can be obtained from a repair order. The C/C/C of the TDS request can be entered by use of the user interface 404 or received by the network interface 406. As an example, the TDS request can include a DTC number (e.g., one or more DTC numbers). As another example, the TDS can include text of a complaint such as, but not limited to, "check engine light on," "engine hesitates on acceleration," or "engine dies at idle."

Block 904 includes transmitting, by the TDS presentation device 116, the TDS request. Transmitting the TDS request can include the network interface 406 transmitting the TDS request over the network 118. The TDS request can include a destination identifier, such as an IP address, of the TDS computing device 114. The TDS request can include a source identifier, such as an IP address, of the TDS presentation device 116. The TDS computing device 114 can output a TDS in response to and based on the TDS request. Outputting the TDS by the TDS computing device 114 can include transmitting the TDS from the TDS computing device 114 or the database 120 over the network 118 to the TDS presentation device 116.

Block 906 includes receiving, by the TDS presentation device 116, the TDS. Receiving the TDS can include the network interface 406 receiving the TDS over the network 118 and the computer-readable medium 402 storing the TDS received by the network interface 406 within the TDS 412.

Block 908 includes outputting, by the TDS presentation device 116, the TDS. In one respect, outputting the TDS can include the user interface 404 or the network interface 406 outputting the TDS. Outputting the TDS by the user interface 404 can include displaying a visual portion of the TDS or playing an audible portion of the TDS. Outputting the TDS by the network interface 406 can include the network interface 406 transmitting the TDS over the network 118 to another device.

In another respect, outputting the TDS can include TDS presentation device 114 transmitting the TDS or a portion thereof to an ECU 146 within the vehicle 136 over at least one of the vehicle interface link 138, the vehicle communication link 134, and a network communication link 124. As an example, the ECU 146 can be configured to present the TDS visually on a display within the vehicle 136 or audibly using an audio speaker within the vehicle 136. As another example, the ECU 146 can control a vehicle driving aspect, such as, but not limited to, controlling an engine to operate at a particular RPM, controlling a steering module within an autonomous vehicle to guide the vehicle along a path, or applying a vehicle brake system to stop or slow down the vehicle 136.

In yet another respect, outputting the TDS can include TDS presentation device 114 outputting control commands over the local communication link 142 to the dynamometer 140. The TDS presentation device 114 can generate the control commands to control operation of the dynamometer 140 so that the dynamometer 140 provides a load to the vehicle 136 that results in the vehicle 136 experiencing load conditions indicated by the TDS.

While the functions in the sets 600, 700, 800, and 900 could be carried out in an order (e.g., a sequential order) as shown in FIG. 6, FIG. 7, FIG. 8, and FIG. 9, respectively, the functions in the sets 600, 700, 800, and 900 do not have to be carried out in a sequential order as shown.

V. Example Test Drive Script

Next, FIG. 12 shows aspects of a TDS 1200 in accordance with the example embodiments. TDS 1200 includes a map 1202 showing paths 1204, 1206, 1208, 1210, 1212, and 1220. TDS 1200 can include path names of the paths, such as Path-1, Path-2, U.S. Highway 1, State Street, or Pennsylvania Avenue. TDS 1200 can include notifications, such as notification 1216, to alert a person regarding aspects of a path featured in the TDS or aspects regarding VDV or DCP used to determine the TDS.

TDS 1200 can also include TDS descriptor 1214 to describe the TDS. TDS descriptor 1214 includes a vehicle identifier (namely vehicle ID 1 (VID-1)), a time reference (e.g., Time-1 to Time-75) that corresponds to times when a vehicle was driven along the path or a baseline path, and C/C/C data so that a user can confirm the TDS pertains to at least a portion of the C/C/C data pertaining to a vehicle-under-service (e.g., a complaint, such as DTC P0115 is set for a vehicle matching the vehicle type VID-1). Other example aspects of a TDS are also possible.

VI. Example Motion Detector

The DCP captured by the system 100 can include motion DCP that indicate motion of a vehicle. In accordance with at least some of the example embodiments, the motion DCP can be captured by a motion detector (e.g., the motion detector 306) located within the data collector 104. To avoid the motion detector 306 detecting motion of the data collector 104 relative to motion of a vehicle, the data collector 104 can be secured to a location within the vehicle while the data collector 104 is capturing motion DCP regarding the vehicle. Various means can be used to secure the data collector 104 to the vehicle, such as, but not limited to, a belt (e.g., a seat belt), a strap, a Velcro® fastener, or an adhesive tape.

Figure 13:
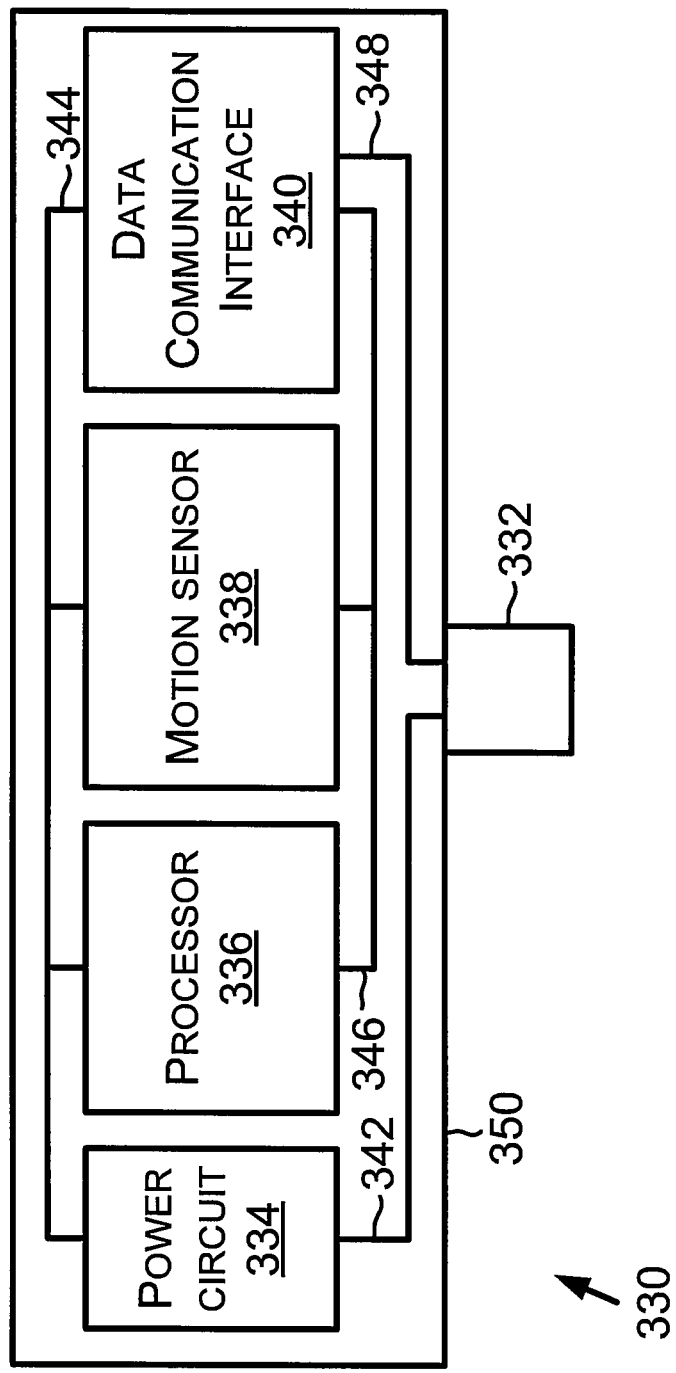
FIG. 13 is a block diagram of a motion detector in accordance with the example embodiments.

FIG. 13 is a block diagram of a motion detector 330. The motion detector 330 can be separate from other elements of the data collector 104 and secured to a position within a vehicle such that the other elements of the data collector 104 can be moved while the vehicle is being driven without affecting the motion DCP captured by motion detector 330.

The motion detector 330 includes a removably-attachable plug-in connector 332, a power circuit 334, a processor 336, a motion sensor 338, a data communication interface (DCI) 340, a communication bus 346, a communication link 348, and a housing 350. One or more of the components shown in FIG. 13 within housing 350 can be mounted on or to a printed circuit board or other substrate (not shown) of the motion detector 330.

The processor 336 can include or connect to a computer-readable medium (not shown) within the motion detector 330. That computer-readable medium can include CRPI executable by the processor 336 to control functions performed by the motion detector 330. Those functions can include, but are not limited to, causing motion sensor 338 to capture DCP pertaining to motion of a vehicle, providing the captured DCP to the DCI 340 using the communication bus 346, and outputting the captured DCP by the DCI 340.

The housing 350 can include or be connected to the plug-in connector 332. The housing 350 can include or form an interior region in which at least a portion of the other elements of the motion detector 330 are located. Housing 350 can prevent damage to the components within the housing 350.

The motion sensor 338 can include one or more accelerometers to detect motion DCP, such as acceleration parameters indicating a straight-line acceleration along a single axis (e.g., an x-axis, y-axis, and a z-axis) experienced by a vehicle (i.e., vehicle acceleration)). The motion sensor 338 can detect acceleration parameters for one or more axis. The motion sensor 338 can include one or more yaw rate sensors to detect motion DCP (e.g., angular acceleration or angular velocity) experienced by a vehicle.

The plug-in connector 332 can be plugged into (e.g., inserted into) a port (e.g., a connection point for a peripheral device, such as the motion detector 330) within a vehicle, such as the vehicle 102 or 136. The port can include, but is not limited to, a cigar lighter port, an accessory voltage (e.g., twelve volt) plug port, a universal serial bus (USB) port, or an Ethernet bus port. Plugging the plug-in connector 332 into a vehicle port attaches motion detector 330 to the vehicle. Removing the plug-in connector 332 from the vehicle port detaches the motion detector 330 from the vehicle.

The power circuit 334 can include a power bus 342 and a power bus 344. The power circuit 334 can include circuit elements to condition the power received from the vehicle and circuit elements to provide the received power to the power bus 344 for distribution to one or more of the processor 336, the motion sensor 338, and the DCI 340. Insertion of the plug-in connector 332 into the vehicle port can result in the power circuit 334 being connected to a power source within the vehicle, such as a vehicle battery, by way of the power bus 342.

The DCI 340 can include a semi-conductor device that is configured to insert DCP received from the motion sensor 338 or the processor 336 into a data stream (e.g., one or more messages) and to output the data stream and DCP using communication link 348. The communication link 348 can include a wireless communication link, such as, but not limited to a Bluetooth® communication link that outputs data using the Bluetooth® protocol. The communication link 348 can include a wired communication link, such as but not limited to an Ethernet or USB that outputs data using an Ethernet or USB protocol respectively. The motion DCP output by the motion detector 330 can be received by the network interface 314 of the data collector 104 or by another element of the system 100.

In accordance with this description, the example embodiments can be arranged in the form of a motion detector that includes a power circuit, a processor, a motion sensor, and a data communication interface. This example motion detector can include a plug-in connector that is removably attachable to a vehicle port. The power circuit can obtain power from the vehicle when the plug-in connector is attached to the vehicle port.

VII. Conclusion

Example embodiments have been described above. Those skilled in the art will understand that changes and modifications can be made to the described embodiments without departing from the true scope and spirit of the present invention, which is defined by the claims.

We claim:

1. A method comprising:
   storing, by a non-transitory computer-readable medium, a plurality of vehicle data values captured from within a first vehicle as the first vehicle is driven on a path;
   storing, by the non-transitory computer-readable medium, a plurality of driving circumstance parameters corresponding to the plurality of vehicle data values captured from within the first vehicle as the first vehicle is driven on the path;
   determining, by at least one processor, a selected vehicle data value;
   determining, by the at least one processor, the plurality of vehicle data values captured from within the first vehicle as the first vehicle is driven on the path comprises the selected vehicle data value;
   generating, by the at least one processor, a test drive script (TDS) comprising instructions to guide a vehicle or a driver of a vehicle on at least a portion of the path the first vehicle was driven on when a vehicle data value of the plurality of vehicle data values matching the selected vehicle data value was captured from within the first vehicle, wherein the TDS is based on the vehicle data value of the plurality of vehicle data values matching the selected vehicle data value and at least a portion of the driving circumstance parameters that correspond to the vehicle data value of the plurality of vehicle data values matching the selected vehicle data value;
   storing, by the non-transitory computer-readable medium, the TDS; and
   outputting, by a network interface to an electronic control unit (ECU) within a second vehicle or to a TDS presentation device being used to diagnose the second vehicle, the stored TDS in response to a TDS request, wherein the first vehicle and the second vehicle are separate individual vehicles.

2. The method of claim 1, wherein the plurality of vehicle data values include vehicle data values selected from the group consisting of (i) a diagnostic trouble code, (ii) a vehicle data value associated with a parameter identifier (PID), and (iii) an electrical measurement of a component installed in the first vehicle.

3. The method of claim 1, wherein the plurality of driving circumstance parameters include driving circumstance parameters selected from the group consisting of (i) a traffic condition parameter, (ii) a meteorological parameter, (iii) a location parameter, and (iv) a motion parameter.

4. The method of claim 1, wherein determining the selected vehicle data value is conditioned on the at least one of the vehicle data values indicating that a diagnostic trouble code is set within the first vehicle or that a value of the at least one of the vehicle data values exceeds a threshold vehicle data value.

5. The method of claim 1, further comprising:
transmitting, over a network by the network interface, a request for at least a portion of the driving circumstance parameters; and
receiving, from the network by the network interface, the at least a portion of the driving circumstance parameters,
wherein the at least a portion of the driving circumstance parameters include driving circumstance parameters selected from the group consisting of (i) a traffic condition parameter, (ii) a meteorological parameter, (iii) a location parameter, and (iv) a motion parameter.

6. The method of claim 1, further comprising:
storing, by the non-transitory computer-readable medium, a complaint, cause, or correction pertaining to servicing the first vehicle,
wherein the TDS request comprises a complaint, cause, or correction matching the complaint, cause, or correction pertaining to servicing the first vehicle, respectively.

7. The method of claim 1, further comprising:
displaying driving instructions on a display of the ECU within the second vehicle or the TDS presentation device or audibly outputting the driving instructions by a loudspeaker of the ECU within the second vehicle or the TDS presentation device.

8. The method of claim 1, wherein at least one of the first vehicle and the second vehicle comprises an autonomous vehicle.

9. A method comprising:
storing, by a non-transitory computer-readable medium, a plurality of vehicle data values captured from within a first vehicle as the first vehicle is driven on a baseline path;
storing, by the non-transitory computer-readable medium, a plurality of driving circumstance parameters corresponding to the plurality of vehicle data values captured from within the first vehicle as the first vehicle is driven on the baseline path;
determining, by at least one processor, the baseline path the first vehicle was driven on when capture of the plurality of vehicle data values occurred;
determining, by the at least one processor, one or more characteristics of the baseline path;
determining, by the at least one processor, an alternate path that is different than the baseline path, wherein one or more characteristics of the alternate path match or approximate the one or more characteristics of the baseline path,
generating, by the at least one processor, a test drive script (TDS) comprising instructions to guide a second vehicle or a driver of the second vehicle on the alternate path, wherein the TDS is based on a selection of at least one of the vehicle data values and at least a portion of the driving circumstance parameters that correspond to the at least one of the vehicle data values;
storing, by the non-transitory computer-readable medium, the TDS; and
outputting, by a network interface to an electronic control unit (ECU) within a second vehicle or to a TDS presentation device being used to diagnose the second vehicle, the stored TDS in response to a TDS request.

10. The method of claim 9, further comprising:
determining, by the at least one processor, the plurality of vehicle data values captured from within the first vehicle as the first vehicle is driven on the baseline path include one or more instances of vehicle data values that match or approximate the at least one of the vehicle data values,
wherein the selection of at least one of the vehicle data values is based on a diagnostic trouble code identifier, a parameter identifier, or a portion of cause, complaint or correction data contained in the TDS request, and
wherein the at least a portion of the driving circumstance parameters include one or more driving circumstance parameters that correspond to vehicle data values that were captured immediately prior to capture of the one or more instances of vehicle data values that match or approximate the at least one of the vehicle data values.

11. The method of claim 9, wherein the one more characteristics of the baseline path include path characteristics selected from the group consisting of (i) a speed limit, (ii) a path inclination, (iii) a path curvature, (iv) a path pavement, (v) a path elevation, (vi) a path name, and (vii) a traffic direction.

12. The method of claim 9, further comprising:
receiving, by the at least one processor, a location identifier and a distance range,
wherein the alternate path is located within an area defined by the location identifier and the distance range.

13. The method of claim 9, further comprising:
determining, by the at least one processor, (i) a start path from a first location to a starting point of the alternate path, wherein generating the TDS includes adding instructions for following the start path prior to the instructions for following the alternate path, or (ii) a return path from an intermediate or ending point of the alternate path to the first location or a second location, wherein generating the TDS includes adding instructions for following the return path after the instructions for following the alternate path.

14. The method of claim 9, wherein the first vehicle is the second vehicle or the first vehicle is different than the second vehicle.

15. A system comprising:
at least one processor;
a network interface; and
a non-transitory computer-readable medium storing a plurality of vehicle data values captured from within a first vehicle as the first vehicle is driven on a path, a plurality of driving circumstance parameters corresponding to the plurality of vehicle data values captured from within the first vehicle as the first vehicle is driven on the path, and computer-readable program instructions,
wherein the program instructions, when executed by the at least one processor, cause a set of functions to be performed, the set of functions including:
determining a selected vehicle data value;
determining the plurality of vehicle data values captured from within the first vehicle as the first vehicle is driven on the path comprises the selected vehicle data value;
generating a test drive script (TDS) comprising instructions to guide vehicle or a driver of a vehicle on at least a portion of the path the first vehicle was driven on when a vehicle data value of the plurality of vehicle data values matching the selected vehicle data value was captured from within the first vehicle, wherein the TDS is based on the vehicle data value of the plurality of vehicle data values matching the selected vehicle data value and at least a portion of the driving circumstance parameters that correspond to the vehicle data value of the plurality of vehicle data values matching the selected vehicle data value;

storing the TDS within the non-transitory computer-readable medium; and outputting, by the network interface to an electronic control unit (ECU) within a second vehicle or to a TDS presentation device being used to diagnose the second vehicle, the stored TDS in response to a TDS request, wherein the first vehicle and the second vehicle are separate individual vehicles.

16. The system of claim 15, wherein the set of functions further include:

associating the TDS with a cause, complaint, or correction that corresponds to a service performed on the first vehicle; and associating the TDS with a vehicle identifier corresponding to the first vehicle.

17. The system of claim 15, wherein the plurality of driving circumstance parameters include driving circumstance parameters selected from the group consisting of (i) a traffic condition parameter, (ii) a meteorological parameter, (iii) a location parameter, and (iv) a motion parameter.

18. A system comprising:

at least one processor;

a network interface; and a non-transitory computer-readable medium storing a plurality of vehicle data values pertaining to a first vehicle, a plurality of driving circumstance parameters corresponding to the vehicle data values, and computer-readable program instructions, wherein the program instructions, when executed by the at least one processor, cause a set of functions to be performed, the set of functions including:

receiving, by the network interface, a location identifier corresponding to a location of a second vehicle;

determining, by the at least one processor, a baseline path the first vehicle was using when capture of the vehicle data values occurred;

determining, by the at least one processor, one or more characteristics of the baseline path;

determining, by the at least one processor, an alternate path that is different than the baseline path, wherein one or more characteristics of the alternate path match or approximate the one or more characteristics of the baseline path, generating a test drive script (TDS) comprising instructions to guide a second vehicle or a driver of the second vehicle on the alternate path, wherein the TDS is based on a selection of at least one of the vehicle data values and at least a portion of the driving circumstance parameters that correspond to the at least one of vehicle data values;

storing the TDS within the computer-readable medium; and outputting, by the network interface to an electronic control unit (ECU) within a second vehicle or to a TDS presentation device being used to diagnose the second vehicle, the stored TDS in response to a TDS request, wherein at least a portion of the second path is within a distance range proximate the location of the second vehicle.

19. The system of claim 18, further comprising:

a communication link that communicatively couples the at least one processor to the network interface, the user interface, and the non-transitory computer-readable medium, wherein the communication link includes a wired communication link or a wireless communication link.

20. The system of claim 18, wherein the first vehicle is the second vehicle or the first vehicle is different than the second vehicle.

21. The system of claim 18, wherein the distance range equals (i) a maximum distance the technician is willing to drive to get to a starting point of a baseline or alternate path, or (ii) a maximum distance the technician is willing to drive to get to the starting point of the baseline or alternate path, to drive the baseline or alternate path, and to drive from an ending point of the baseline or alternate path back to the technician's repair shop or other location.

22. A system comprising:

at least one processor;

a network interface; and a non-transitory computer-readable medium storing a plurality of vehicle data values pertaining to a first vehicle, a plurality of driving circumstance parameters corresponding to the vehicle data values, and computer-readable program instructions, wherein the program instructions, when executed by the at least one processor, cause a set of functions to be performed, the set of functions including:

generating a test drive script (TDS) based on a selection of at least one of the vehicle data values and at least a portion of the driving circumstance parameters that correspond to the at least one of the vehicle data values;

determining, by the at least one processor, (i) a start path from a first location to a starting point of a baseline path, wherein generating the TDS includes adding instructions for following the start path prior to the instructions for following the baseline path, or (ii) a return path from an intermediate or ending point of the baseline path to the first location or a second location, wherein generating the TDS includes adding instructions for following the return path after the instructions for following the baseline path;

storing the TDS within computer-readable medium; and outputting, by the network interface to an electronic control unit (ECU) within a second vehicle or to a TDS presentation device being used to diagnose the second vehicle, the stored TDS in response to a TDS request.

23. A non-transitory computer-readable medium storing program instructions, that when executed by at least one processor, cause a set of functions to be performed, the set of functions comprising:

storing, by the non-transitory computer-readable medium, a plurality of vehicle data values captured from within a first vehicle as the first vehicle is driven on a path;

storing, by the non-transitory computer-readable medium, a plurality of driving circumstance parameters corresponding to the plurality of vehicle data values captured from within the first vehicle as the first vehicle is driven on the path;

determining a selected vehicle data value;

determining the plurality of vehicle data values captured from within the first vehicle as the first vehicle is driven on the path comprises the selected vehicle data value;

generating a test drive script (TDS) comprising instructions to guide a vehicle or a driver of a vehicle on at least a portion of the path the first vehicle was driven on when a vehicle data value of the plurality of vehicle data values matching the selected vehicle data value was captured from within the first vehicle, wherein the TDS is based on the vehicle data value of the plurality of vehicle data values matching the selected vehicle data value and at least a portion of the driving circumstance parameters that correspond to the vehicle data value of the plurality of vehicle data values matching the selected vehicle data value;

storing, by the non-transitory computer-readable medium, the TDS; and outputting, by a network interface to an electronic control unit (ECU) within a second vehicle or to a TDS presentation device being used to diagnose the second vehicle, the stored TDS in response to a TDS request, wherein the first vehicle and the second vehicle are separate individual vehicles.

* * * * *